United States Patent
Cipriano et al.

(10) Patent No.: US 9,432,223 B2
(45) Date of Patent: Aug. 30, 2016

(54) METHOD OF WIDELY LINEAR TURBO-EQUALIZATION IN A MULTI-USER CONTEXT AND FOR A MULTI-CHANNEL MULTI-ANTENNA RECEIVER

(71) Applicant: THALES, Courbevoie (FR)

(72) Inventors: Antonio Cipriano, Gennevilliers (FR); Olivier Goubet, Gennevilliers (FR)

(73) Assignee: Thales, Courbevoie (FR)

(*) Notice: Subject to any disclaimer, the term of this patent is extended or adjusted under 35 U.S.C. 154(b) by 0 days.

(21) Appl. No.: 14/720,140

(22) Filed: May 22, 2015

(65) Prior Publication Data

US 2015/0341190 A1  Nov. 26, 2015

(30) Foreign Application Priority Data

May 23, 2014  (FR) ..................... 14 01178

(51) Int. Cl.
| | |
|---|---|
| *H04L 25/03* | (2006.01) |
| *H04L 1/06* | (2006.01) |
| *H04L 27/01* | (2006.01) |
| *H04L 1/00* | (2006.01) |
| *H04L 25/06* | (2006.01) |

(52) U.S. Cl.
CPC ....... *H04L 25/03076* (2013.01); *H04L 1/0048* (2013.01); *H04L 1/0631* (2013.01); *H04L 25/03159* (2013.01); *H04L 25/03891* (2013.01); *H04L 25/03968* (2013.01); *H04L 25/067* (2013.01); *H04L 27/01* (2013.01)

(58) Field of Classification Search
CPC ............................ H04L 1/0631; H04L 27/01
See application file for complete search history.

(56) References Cited

U.S. PATENT DOCUMENTS

| | | | | |
|---|---|---|---|---|
| 2005/0220200 | A1* | 10/2005 | Giannakis | H04L 5/023 375/260 |
| 2012/0324315 | A1* | 12/2012 | Zhang | H04L 1/004 714/776 |
| 2013/0336425 | A1* | 12/2013 | Lee | H04L 27/12 375/303 |

OTHER PUBLICATIONS

Dietl, Guido; Mensing, Christian; Utschick, Wolfgang, "Iterative Detection Based on Widely Linear Processing and Real-Valued Symbol Alphabets," in Wireless Conference 2005—Next Generation Wireless and Mobile Communications and Services (European Wireless), 11th European , vol., No., pp. 1-5, Apr. 10-13, 2005.*
P. Chevalier et al., "New Insights into Optimal Widely Linear Array Receivers for the Demodulation of BPSK, MSK, and GMSK Signals Corrupted by Noncircular Interferences—Application to SAIC", IEEE Transactions on Signal Processing, vol. 54, No. 3, pp: 870-883, Mar. 2006.

(Continued)

*Primary Examiner* — Ross Varndell
(74) *Attorney, Agent, or Firm* — Baker & Hostetler LLP

(57) ABSTRACT

A method of equalizing a signal received by a plurality of antenna elements, the received signal being produced by the transmission of signals by a plurality of transmitters, includes: a step of converting the received signal into the frequency domain; a step of subtracting from the signal an estimate of the intersymbol interference and the interference between users so as to obtain a complex corrective signal; a step of conjoint widely linear filtering of the complex corrective signal and the conjugate complex corrective signal to obtain an equalized signal; a step of converting the equalized corrective signal into the time domain; a step of calculating coefficients of the at least one equalizer filter from the covariance matrix and the pseudo-covariance matrix of the received signal.

11 Claims, 12 Drawing Sheets

(56) References Cited

OTHER PUBLICATIONS

M. Tüchler et al., "Turbo Equalization: An Overview," IEEE Transactions Information Theory, vol. 57, No. 2, pp. 920-952, Feb. 2011.
T. Li et al., "Turbo Equalization for LTE Uplink Under Imperfect Channel Estimation," in Proc. IEEE 20th International Symposium Pers., Indoor Mobile Radio Communication, pp. 330-334, Sep. 2009.
Zhongxia Pan et al., "Practical Soft-SIC Detection for MIMO SC-FDMA System with Co-Channel Interference", 2010 International Conference on Wireless Communications and Signal Processing (WCSP 2012), pp. 1-5, Oct. 21-23, 2010.
S.-R. Lee et al., "Iterative Multiuser Detection for LDPC MIMO SC-FDMA Communication Systems", Transactions on Emerging Telecommunications Technologies DOI: 10.1002/ett.2773, Jan. 2014.
Melanie Witzke, "Linear and Widely Linear Filtering Applied to Iterative Detection of Generalized MIMO Signals," Annals of Telecommunications, vol. 60, No. 1-2, Feb. 1, 2005, pp. 147-168, XP019968336.
Xiaojun Yuan et al., "Low-Complexity Iterative Detection in Multi-User MIMO ISI Channels," IEEE Signal Processing Letters, vol. 15, Jan. 1, 2008, pp. 25-28, XP011202806.
Guido Dietl et al., "Iterative Detection Based on Widely Linear Processing and Real-Valued Symbol Alphabets," Institute for Circuit Theory and Signal Processing, 11th European Wireless Conference, Apr. 2005, pp. 1-5, XP002738242.
Tetsushi Abe et al., "Space-Time Turbo Equalization and Symbol Detection in Frequency Selective MIMO Channels," IEEE 54th Vehicular Technology Conference, Oct. 7, 2001, vol. 2, pp. 1230-1234, XP010562628.

* cited by examiner

METHOD OF WIDELY LINEAR TURBO-EQUALIZATION IN A MULTI-USER CONTEXT AND FOR A MULTI-CHANNEL MULTI-ANTENNA RECEIVER

CROSS-REFERENCE TO RELATED APPLICATION

This application claims priority to foreign French patent application No. FR 1401178, filed on May 23, 2014, the disclosure of which is incorporated by reference in its entirety.

FIELD OF THE INVENTION

The field of the invention is that of digital radio communication systems and more particularly multi-antenna communication receivers, i.e. receivers with a plurality of receiving antennas.

The invention also concerns multi-user systems in which communication resources are shared between a plurality of users who can communicate simultaneously by sharing frequency bands or timeslots.

The invention is more generally concerned with all multi-user communication systems in which high levels of interference are generated both between transmitters associated with different users and also between the symbols conveyed by a signal transmitted by one user because of interference inherent to the propagation channel.

It is known to employ equalization in the receiver to eliminate or at least to limit interference generated in the received signal. The object of this functionality is to cleanse the received signal of the various sources of interference before it is decoded.

In this context, the invention is precisely concerned with the field of the equalization of signals in a multi-user context and also the field of turbo-equalization, which entails iteration of the equalization and decoding functions with the final objective of improving the bit error rate or the packet error rate of the decoded symbols.

The invention notably finds an application in cellular communication systems such as the 3GPP LTE system.

The objective of the invention is notably to design a turbo-equalizer based on a widely linear equalization filter. Such a filter has the property of processing separately the real part and the imaginary part of the signal so as to exploit optimally all of the information contained in the signal in order to improve equalization performance. A widely linear equalizer more particularly offers improved performance for signals modulated on the basis of a real constellation or a complex constellation having the property of non-circularity.

The invention is also aimed at an equalization method in the frequency domain that is suited to a multi-user context.

BACKGROUND

Numerous publications cover the field of the equalization of signals subject to intersymbol interference or interference between users. Of these, references [1] to [6] may be cited (see the list of references at the end of the description).

Known equalization methods do not make it possible to take the following three aspects into account conjointly, however:

the use of a widely linear filtering technique that consists in applying an equalizer filter both to the received complex signal and also to its conjugate, the use of equalization in the frequency domain, the management of multi-user constraints, in other words management of equalization of multi-user interference and not only intersymbol interference for a single user.

SUMMARY OF THE INVENTION

When this technique is employed, this is usually for single-user applications and for processing carried out in the time domain.

In order to improve known equalization methods, the invention proposes a method of widely linear equalization that aims to eliminate the interference between multiple users and that is applied in the frequency domain.

The invention is particularly advantageous when the signal is modulated using a real constellation, which implies that the pseudo-correlation matrix of the signal is a non-null matrix and can be used to improve the equalization filter.

To this end, the invention consists in a method of equalizing a signal received by a plurality of antenna elements, said received signal being produced by the transmission of signals by a plurality of transmitters, said method including:

a step of converting the received signal into the frequency domain, a step of subtracting from said signal an estimate of the intersymbol interference and the interference between users so as to obtain a complex corrective signal, a step of conjoint widely linear filtering of said complex corrective signal and the conjugate complex corrective signal to obtain an equalized signal, a step of converting the equalized corrective signal into the time domain, a step of calculating coefficients of the equalizer filter from the covariance matrix and the pseudo-covariance matrix of the received signal.

In accordance with one particular embodiment, the method in accordance with the invention of equalizing a received signal further includes:

a step of subtracting from said received signal an estimate of the transmitted signal, and a step of combining the equalized signal with an estimate of the transmitted signal, the step of widely linear filtering being configured to produce from a number $N_R$, equal to the number of antenna elements, of complex corrective signals, a number K, equal to the number of transmitted signals, of equalized complex corrective signals.

In accordance with one particular aspect of the invention, the step of widely linear filtering includes filtering said complex corrective signal using a first equalizer filter and the conjugate complex corrective signal using a second equalizer filter.

In accordance with one particular aspect of the invention, the step of widely linear filtering includes filtering said complex corrective signal using an equalizer filter and said equalization method further includes a step of extracting the real part of each value of the equalized signal converted into the time domain.

In accordance with one particular aspect of the invention, the step of widely linear filtering includes filtering said complex corrective signal using an equalizer filter and said equalization method further includes a step of extracting alternately the real part or the imaginary part of each successive value of the equalized signal converted into the time domain.

In accordance with one particular aspect of the invention, the step of calculating the coefficients of the equalizer filter includes at least:
- a sub-step of calculating the equalizer filter in the frequency domain and of calculating an estimate of the amplitude of the symbols of the transmitted signal,
- a sub-step of calculating the covariances and pseudo-covariances of the signal after equalization.

The invention also consists in a method of turbo-equalization of a received signal including the iterative execution of the following steps:
- a step of executing the method in accordance with the invention of equalizing a received signal,
- a step of converting the equalized signals into demodulated bits,
- a step of decoding the demodulated bits,
- a step of converting the decoded bits into an estimate of the transmitted signal.

The invention also concerns the use of the method in accordance with the invention of equalizing a received signal or the turbo-equalization method in accordance with the invention applied to a signal modulated in accordance with a real constellation, for example a constellation of the BPSK or M-PAM type.

The invention also concerns the use of the method in accordance with the invention of equalizing a received signal or the turbo-equalization method in accordance with the invention applied to a signal modulated in accordance with an alternately real or imaginary constellation, for example a constellation of the $\pi/2$-BPSK or $\pi/2$-M-PAM type.

The invention further consists in a computer program including instructions for executing the method in accordance with the invention of equalizing a received signal or the turbo-equalization method in accordance with the invention when the program is executed by a processor and a receiver including a plurality of antenna elements for receiving a signal transmitted by a plurality of transmitters and a processor configured to execute the method in accordance with the invention of equalizing a received signal or the turbo-equalization method in accordance with the invention.

BRIEF DESCRIPTION OF THE DRAWINGS

Other features and advantages of the present invention will become more apparent after reading the following description with reference to the appended drawings, in which.

DETAILED DESCRIPTION

The following notation is used through the description of the invention.

Variables designated by a lowercase letter, such as x, designate a scalar quantity;

Variables designated by a boldface lowercase character, such as x, designate a vector quantity;

Variables designated by a boldface uppercase letter, such as X, designate a matrix;

$[x_i]_{i=1 \ldots N}$ is a vector containing the coefficients $x_i$;

$$[X_{i,j}]_{\substack{i=1 \ldots N_R \\ j=1 \ldots K}}$$

is a block matrix that contains the matrices $X_{i,j}$;

diag(x) is a diagonal matrix with the coefficients x on its diagonal;

circ(x) is a circulant matrix with its first column equal to x;

E[X] designates the mathematical expectation of the random variable X;

⊗ designates the Kroenecker product of two matrices;

$x^T$ is the transposed vector of x;

$X^T$ is the transposed matrix of X;

$x^H$ is the Hermitian vector of x, that is to say the conjugate transpose vector of x;

$X^H$ is the Hermitian matrix of X, that is to say the conjugate transpose matrix of X;

tr(X) is the trace of the matrix X;

$I_N$ is the identity matrix of size N×N;

$F_M$ is the Fourier transform matrix of size M×M, the entry k,l of this matrix is equal to $$[F_M]_{k,l} = \frac{1}{\sqrt{M}} \exp\left(-\frac{2j\pi kl}{M}\right),$$

k=0 ... M−1 and l=0 ... M−1. The inverse of the Fourier transform matrix coincides with its conjugate transposition: $F_M^H$.

Hereinafter, the term mapping is used to designate the conversion of one or more bits to a symbol of the constellation of the modulation used to shape the signal.

The term demapping is used to designate the inverse transform of the mapping operation, namely the conversion of a modulated symbol to one or more bits according to the constellation used.

The expression soft mapping designates the mapping operation when the latter is executed for so-called soft bits, in other words bits represented by a non-binary value, typically between 0 and 1, that is characteristic of their likelihood probability.

The expression soft demapping designates the operation inverse to the soft mapping operation.

Figure 1:
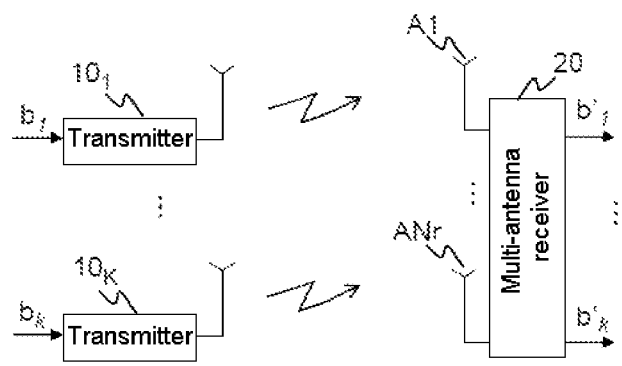
FIG. 1 is a diagram of a multi-user communication system including a receiver with multiple antennas.

FIG. 1 is a diagram of the communication system that the invention concerns. It is a multi-user wireless transmission system comprising a plurality of transmitters $10_1, \ldots 10_K$ each transmitting a radio signal to the same receiver 20 which has a plurality of receiving antennas $A_1, \ldots A_{Nr}$ where Nr is the number of antennas and at least equal to 1. The transmitters $10_1, \ldots 10_K$ each transmit a signal using the same time and frequency resources, which causes interference between users from the point of view of the receiver 20. K is equal to the number of transmitters or users.

The system shown in FIG. 1 is usually referred to as a distributed multiple input multiple output (MIMO) system.

Figure 2:
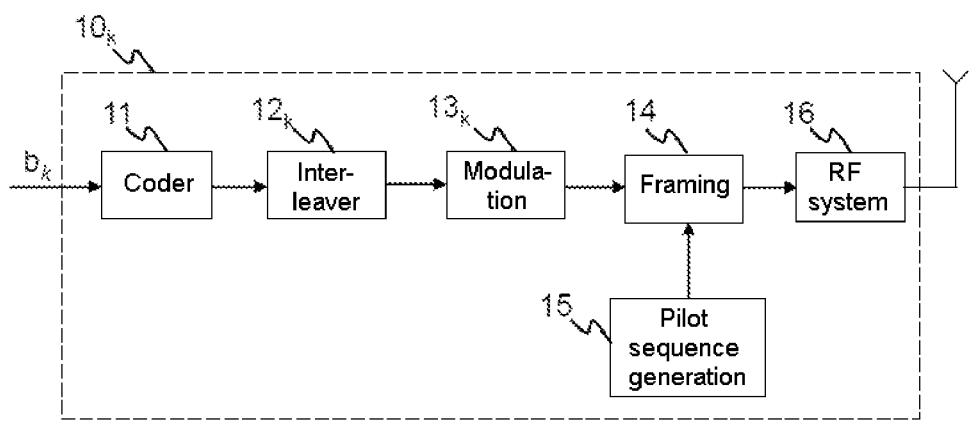
FIG. 2 is a block diagram of a transmitter designed to function in cooperation with a receiver including a turbo-equalizer in accordance with the invention.

FIG. 2 shows an example of a transmitter $10_k$ compatible with the system at which the invention is aimed. It should be noted that the invention precisely relates to a method of equalization employed by a receiver 20 and does not include any steps executed by a transmitter. However, the type of transmitter envisaged is described by way of example only in order to facilitate a general understanding of the invention. The functions shown in FIG. 2 may be in part optional and more generally the transmitter described may be replaced by other types of transmitter.

The transmitter $10_k$ receives as input information bits that are coded using an error-correcting encoder 11; the code may be a convolutional code, a turbo code, an LDPC code or any other code for which there exists a decoding algorithm that produces soft information, that is to say non-binary information. The coded bits at the output of the encoder 11 are interleaved using an interleaver $12_k$ that may be different for each transmitter $10_1, \ldots 10_K$.

The interleaved bits are then modulated by a modulator $13_k$ that may differ from one user to another. The modulator $13_k$ supplies as output symbols belonging to a given constellation defined as a function of the type of modulation chosen. As described in more detail hereinafter, the invention offers improved performance for real constellations in particular, that is to say constellations where the modulated symbols have a null imaginary part.

More generally, the invention makes it possible to obtain results improved over known linear equalization techniques when the constellation used for the modulation of the transmitted signal has a property of so-called non-circularity. The property of non-circularity is expressed formally by the fact that if s(n) is a random symbol of the constellation transmitted at time n, then the mathematical expectation of this symbol squared is not equal to zero $E[s^2(n)] \neq 0$. The quantity $E[s^2(n)]$ is also referred to as the pseudo-covariance in the literature. This property also extends to sampled or continuous signals. For the vectors representing a signal portion, the pseudo-correlation is written $E[s\, s^T]$. The invention applies with advantage when this pseudo-correlation has a non-null value.

Real constellations, also known as rectilinear (real value) constellations such as binary phase shift keying (BPSK) modulation or pulse amplitude modulation (PAM) are non-circular. The invention may also be applied to real constellations rotated periodically such as π/2-BPSK, which alternate on each modulated symbol a standard BPSK constellation {+1, −1} and a BPSK constellation rotated π/2 radians {+j, −j}.

The invention may also be applied to so-called quasi-rectilinear constellations, that is to say constellations where the symbols may be obtained by complex filtering of a signal described by the symbols of a real constellation. Examples of such modulation are minimum shift keying (MSK), Gaussian minimum shift keying (GMSK), continuous phase modulation (CPM) with binary alphabet or offset quadrature amplitude modulation (OQAM). The invention may also be applied to non-circular complex symbols, such as rectangular QAM constellations that do not have circular symmetry, for example, such as 8-QAM.

More generally, the invention applies with advantage to modulation that has the property of non-circularity. The invention may equally be applied to modulation that does not have this property but in this case the improvement in equalization performance will be negligible.

The modulated symbols are then sent to a framing block 14 that organizes the data by blocks in a frame and can also insert pilot sequences that the receiver uses to estimate the channel, for example. The pilot sequences are generated by a module 15. Moreover, the block 14 implements a method of partial periodization of the data blocks that enables the receiver to implement an equalizer in the frequency domain. For example, the block 14 may implement orthogonal frequency division multiplexing (OFDM) modulation with a total of N sub-carriers including M sub-carriers used with a cyclic prefix (CP) and possibly a cyclic suffix (CS). The block 14 may implement single carrier-frequency division multiple access (SC-FDMA) modulation, with M sub-carriers used for precoding with a discrete Fourier transform (DFT). The CP and possibly the CS are also used here. In this context, if N=M, the transmitter implements a single-carrier (SC) signal.

The transmitter also includes an analogue RF system 16 for shaping the signal for transmission by radio. This system 16 introduces imbalances between the phase channel I and the quadrature channel Q yielding a non-circular signal at the output of the block 16. If the I, Q imbalances are known at the receiving end, then the invention can also be applied to this type of signal even if the modulation used does not have the property of non-circularity.

The equalization method conforming to the various embodiments of the invention is described in detail hereinafter. The appended figures show the functional structure of a receiver device configured to implement the equalization method in accordance with the invention. These figures show interchangeably the modules that a receiver device in accordance with the invention includes and the steps of the method in accordance with the invention, it being understood that each module is configured to execute a corresponding step of the method in accordance with the invention.

Figure 3:
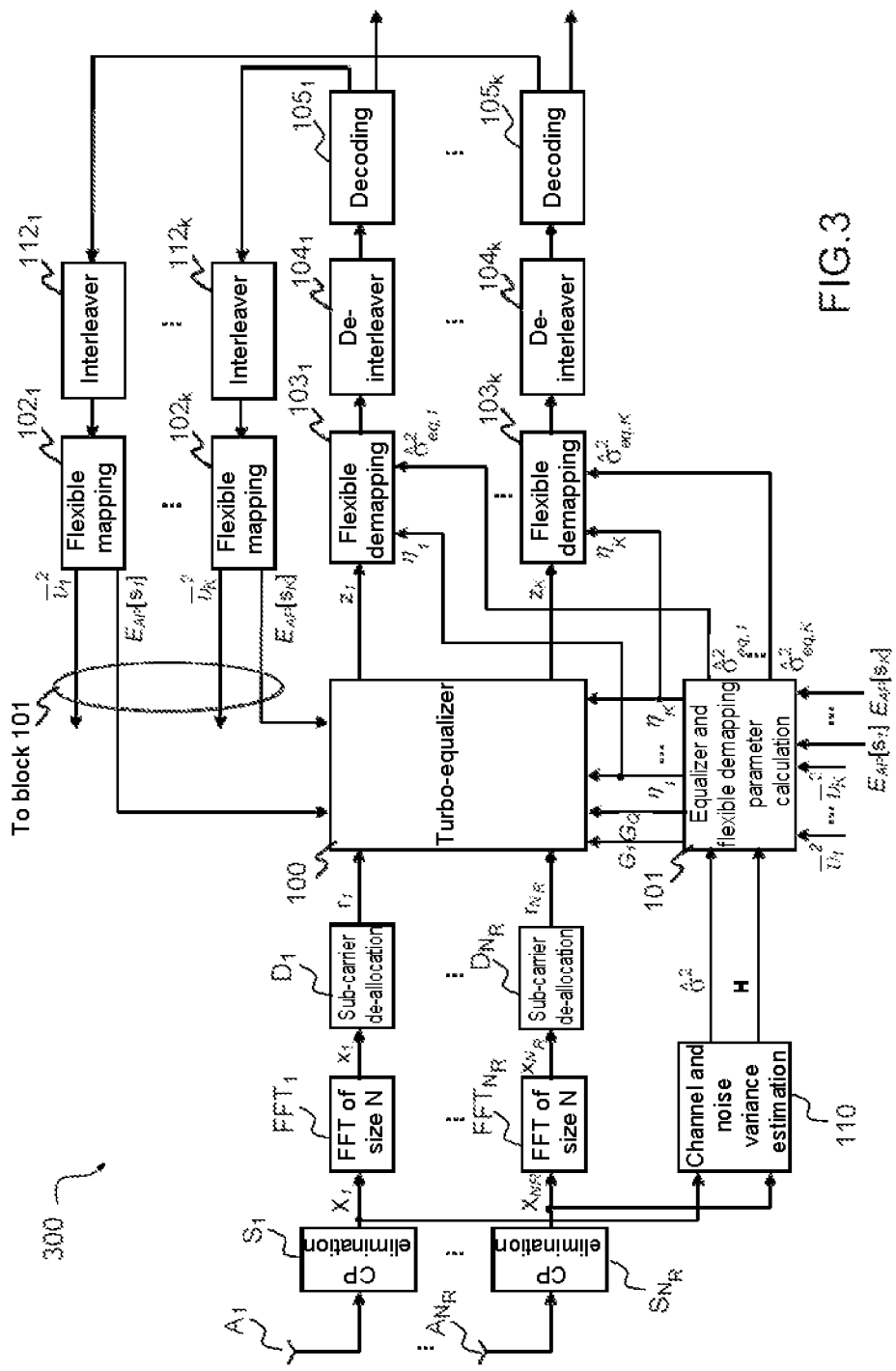
FIG. 3 is a block diagram of a receiver in accordance with the invention.

FIG. 3 shows the overall functional structure of a widely linear receiver in accordance with the invention.

Such a receiver 300 implements an iterative interference cancellation (IC) algorithm the end purpose of which is to eliminate as much as possible intersymbol interference (ISI) and multi-user interference (MUI). When the transmitting antennas are located in the same equipment, multi-user interference MUI is instead called inter-antenna interference. Moreover, in the iterations the algorithm implements widely linear filtering that makes it possible to discriminate signals received from two transmitters even with only one antenna.

In the system considered here, intersymbol interference is generated when the symbols of the signal of the user of interest pass through a multi-path (frequency-selective) channel. MUI interference is generated by the signals of other users that are transmitted using the same time-frequency resources and that are superposed on the signal of the user of interest in a non-orthogonal manner. This is because, although the user signals are transmitted by different antennas, as a general rule there is no perfect spatial separation, except in very special cases.

FIG. 3 is a functional block diagram of the receiver 300 when the signals transmitted are produced using a so-called SC-FDMA technique with insertion of the CP. It is assumed here that the signals from the transmitters are synchronized at the receiver with an accuracy less than the duration of the CP and that a synchronization algorithm has supplied the time of synchronization at the receiver.

The signals are received by the various antennas $A_1, \ldots A_{NR}$ of the receiver and are formatted into blocks of data. On each receiving antenna, data blocks are extracted after which a step $S_1, \ldots S_{NR}$ of eliminating the CP is executed. The data blocks coming from the antennas of the receiver then undergo a fast Fourier transform step $FFT_1, \ldots FFT_{NR}$ of size N in order to convert the signals from the time domain to the frequency domain. The blocks of samples at the exit from the FFTs then enter blocks $D_1, \ldots D_{NR}$ that operate a selection of the inputs corresponding to the sub-carriers actually occupied by the wanted signal. The users use the same M sub-carriers, in other words there are recovered at this stage only the wanted signals allocated to the M sub-carriers used and the sub-carriers that are not used are eliminated. Following the sub-carrier de-allocation blocks or steps, the data is grouped into vectors $r_n, n=1, \ldots, N_R$ of size M.

In parallel with this, the pilot sequences are extracted from the signals coming from the receiving antennas and fed into the block 110 that estimates the response of the channels and the variance of the noise. This step 110 is used to obtain an estimate of the frequency response of the channels between each transmitter and each receiving antenna on the M sub-carriers of interest (those used by the users to send information). These frequency responses are organized for simplicity of exposition in a block diagonal matrix $$H = [H_{ik}]_{\substack{i=1\ldots N_R \\ k=1\ldots K}}$$

of size $(N_R M) \times (K M)$, in which each matrix $H_{ij}$ is a diagonal matrix and contains on its diagonal the estimate of the frequency response of the channel between user k and receiving antenna i. The step executed by the block 110 also supplies an estimate of the variance of the thermal noise at each receiving antenna or the mean of all these variances. The second hypothesis is used hereinafter.

The estimate H of the MIMO channel and of the variance of the noise is then fed to the block 101 that executes a step of calculation of the equalizer and the parameters linked to the soft demapping. This block also receives as input the quantities $E_{AP}[s_k]$, k=1, ... K, which are vectors containing the soft estimates of the symbols sent by the transmitters, and the quantities $\bar{v}_k^2$, k=1, ..., K, which are measurements of the variance of the symbols sent by the transmitters, averaged over the block length M for each transmitter. $E_{AP}[\bullet]$ designates the conditioned mean over all the a priori information coming from the decoders and calculated during the preceding iteration. The quantities $E_{AP}[s_k]$ and $\bar{v}_k^2$ are supplied to the block 101 by soft mapping modules $102_1, \ldots 102_K$ described later.

The receiver 300 executes iterative processing.

On the first iteration, when there is no soft information coming from the decoder, the quantity $\bar{v}_k^2 = E_s$, where $E_s$ is the mean energy of the symbols of the original constellations of users, assumed constant for all users, and $E_{AP}[s_k]=0$, for all k=1, ... K.

The block 101 supplies as output on each iteration the coefficients $G_I$ and $G_Q$, of the equalizer, the parameters $\eta_k$ for k=1, ..., K, which provide a measurement of the mean amplitude of the wanted signals after equalization and the quantities $\hat{\sigma}_{eq,k}^2$, k=1, ..., K, which are estimates of the noise after equalization for each user.

The vectors $r_n$, n=1, ..., $N_R$ of size M are fed to the module 100 that carries out the step of turbo-equalization in accordance with the invention and that takes as input the coefficients $G_I$ and $G_Q$, of the equalizer, the parameters $\eta_k$ for k=1, ..., K, and the vectors with the soft estimates of the transmitted symbols $E_{AP}[s_k]$, k=1, ... K. The block 100 executes the ISI and MUI interference cancellation (IC). It supplies as output K equalized symbol vectors $z_k$, k=1, ..., K of size M.

Note that for the general case of complex constellations (not shown in FIG. 3) there will be two sets of parameters $\eta_{I,k}$ and $\eta_{Q,k}$ for k=1, ..., K, that correspond to the estimated amplitudes of the wanted signal and its conjugate.

Each vector $z_k$ corresponding to a transmitter is then sent to a soft demapping module $103_1, \ldots 103_K$ that produces soft metrics for each bit that are linked to the probability that the bit is 0 or 1. This soft demapping module takes different forms according to the statistic of the signal after equalization: if the starting constellation is real there may be used a demapper for symmetrical complex Gaussian statistics, otherwise a demapper for Gaussian statistics with non-null pseudo-covariance is more suitable.

The soft metrics are then de-interleaved by a de-interleaver $104_1, \ldots 104_K$ that is the inverse of the interleaver $12_k$ used by a transmitter. Then, when all the bits of a packet of data have been recovered, the soft metrics are fed to a decoder $105_1, \ldots 105_K$ that produces estimates of the bits sent and extrinsic information EXT that is a measure of the probability that the bits are 0 and 1 but after decoding of the error-correcting code eliminating the influence of the equalizer.

The extrinsic information EXT is then fed to the interleaver $112_k$ of user k to be interleaved. The interleaved extrinsic information EXT enters a soft mapping module $102_k$ that calculates for each block the soft estimates of the transmitted symbols $E_{AP}[s_k]$ and the estimate of the mean variance $\bar{v}_k^2$ of the transmitted symbols.

The output from the blocks $112_k$ are fed to the blocks 100 and 101 to start a new iteration. The equalization step 100 and the decoding steps $105_1, \ldots 105_K$ are iterated a predetermined number of times.

The equalization method in accordance with a first embodiment of the invention executed by the turbo-equalization module 100 of the receiver 300 is described in more detail next.

Figure 4:
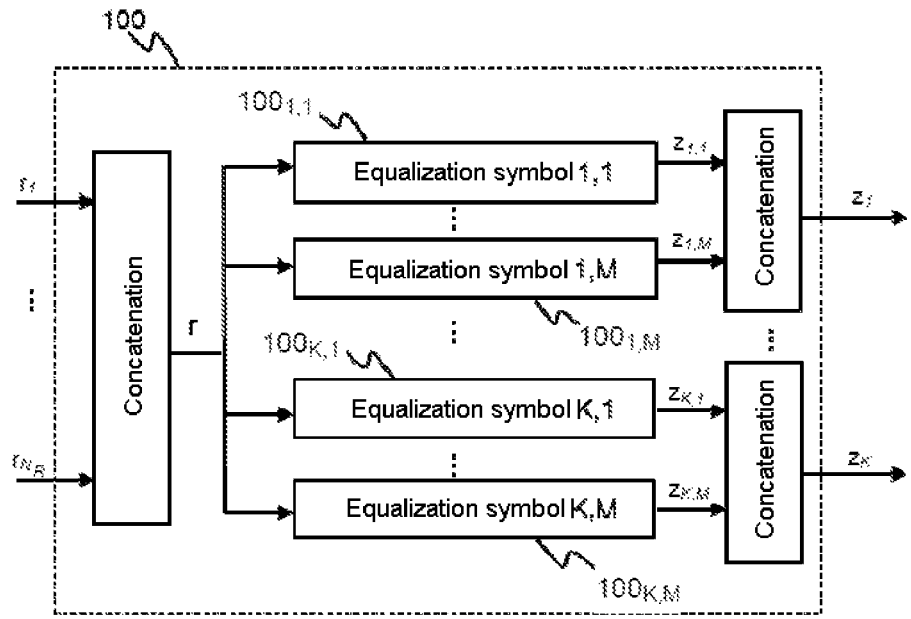
FIG. 4 is a block diagram of a turbo-equalizer in accordance with a first embodiment of the invention.

FIG. 4 shows this first embodiment of the turbo-equalization module 100.

In accordance with the invention, the turbo-equalization module 100 implements the method of widely linear turbo-equalization in the frequency domain on the signals coming from the $N_R$ antennas of the receiver.

From the functional point of view, the objective of the turbo-equalization block 100 is to cancel MUI interference and ISI interference and to equalize the signals in the space-frequency domain.

A first implementation of the block 100 consists in applying an equalizer $100_{1,1} \ldots 100_{K,M}$ to each signal symbol received on each of the M wanted sub-carriers from K transmitters simultaneously transmitting a signal to the receiver as represented in FIG. 4.

Figure 5:
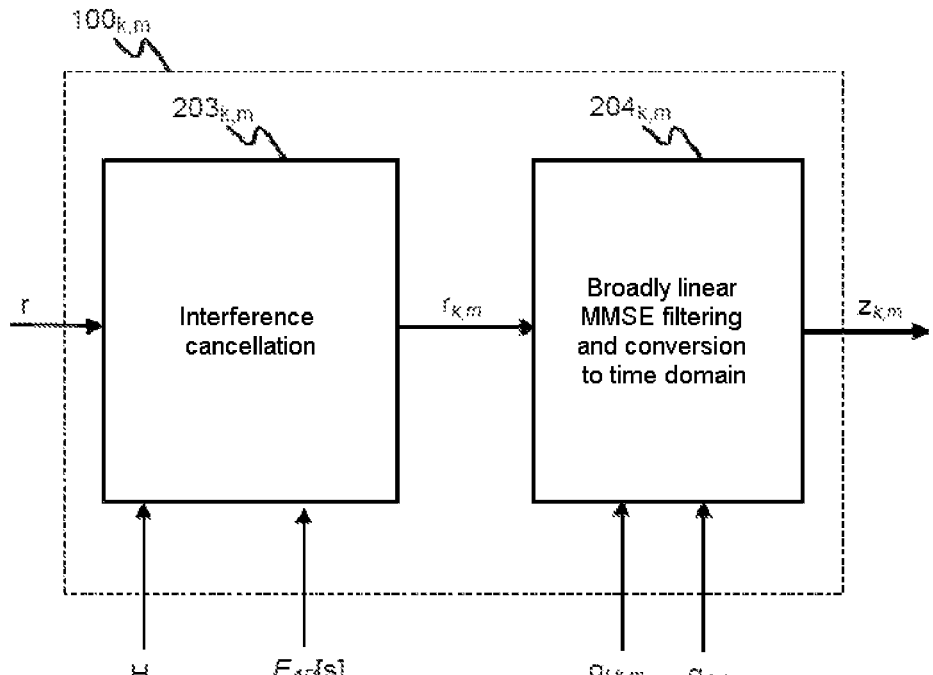
FIG. 5 is a diagram showing in detail the function of equalizing a symbol in the FIG. 4 turbo-equalizer.

Each equalizer $100_{k,m}$ comprises two main functions, a first function $203_{k,m}$ of interference cancellation and a second function $204_{k,m}$ of widely linear filtering of the frequency-domain signal. This subdivision is represented in FIG. 5.

To explain the structure of the turbo-equalizer in accordance with the invention in more detail, it is necessary to introduce definitions enabling processing of the soft information output by the decoders.

$E_{AP}[\cdot]$ is the conditioned mean over all the a priori information and $E_{k,m}[\cdot]$ is the conditioned mean over all the a priori information except for the information relating to the $m^{th}$ symbol of the $k^{th}$ user. This corresponds to the fundamental idea of turboprocessing whereby, in processing a given symbol, soft information coming from the preceding iteration concerning the same symbol must not be used.

Consequently, $E_{k,m}[s_{k,m}]=0$ and $E_{k,m}[|s_{k,m}|^2]=E_s$. It follows that $E_{k,m}[s]=E_{AP}[s]-E_{AP}[s_{k,m}]e_{m+(k-1)M}=E_{AP}[\tilde{s}]$ where the vector $\tilde{s}=s-s_{k,m}e_{m+(k-1)M}$ is equal to the vector s with the $(m+(k-1)M)^{th}$ entry set to zero, and where the vector $e_{m+(k-1)M}$ is a column vector of size KM×1 consisting of zeroes with the exception of the coefficient of index $(m+(k-1)M)$ that is equal to 1.

Assuming that the aim is to equalize the $m^{th}$ symbol of the $k^{th}$ user, there is first subtracted an estimate of the total interference reconstructed from the soft information for all the symbols except the $m^{th}$ symbol of the $k^{th}$ user (which is expressed formally by the operator $E_{k,m}[S]$) and thus there is formed the signal $r_{k,m}$.

$$r_{k,m} = r - H(I_K \otimes F_M)E_{k,m}[s] = r - \mathcal{B}E_{k,m}[s] \quad (1)$$

The interference cancellation block $203_{k,m}$ produces as output the vector $r_{k,m}$ from the input signal vector r, the estimated matrix H of the channel and the estimates of the symbols $E_{AP}[s]$ supplied by the soft mapping modules $102_k$.

Figure 6:
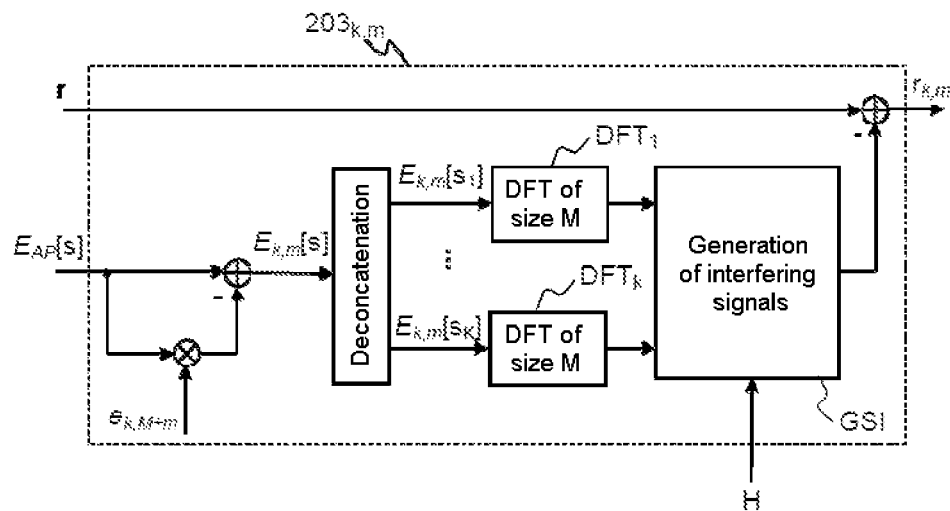
FIG. 6 is a diagram showing in detail the function of eliminating interference in the FIG. 5 equalization function.

FIG. 6 represents in more detail the functions executed by the interference cancellation block $203_{k,m}$. This block executes no more nor no less than the processing represented by equation (1). In other words, the estimate $E_{AP}[s]$ is multiplied by the vector $e_{m+kM}$ and the result of the multiplication is subtracted from the estimate $E_{AP}[s]$ to produce the vector $E_{k,m}[s]$ after which an inverse Fourier transform $DFT_1, \ldots DFT_K$ is applied to each portion of the vector $E_{k,m}[s]$ corresponding to a user. Finally, an interfering signal generation step GSI executes the multiplication of the outputs of the DFT by the channel estimate matrix H. The interfering signal obtained is finally subtracted from the received signal r.

The signal represented by the vector $r_{k,m}$ corresponds to the received signal from which has been removed the interference generated by all the symbols except the $m^{th}$ symbol of the $k^{th}$ user. It is then filtered via a step $204_{k,m}$ of widely linear filtering.

Figure 7:
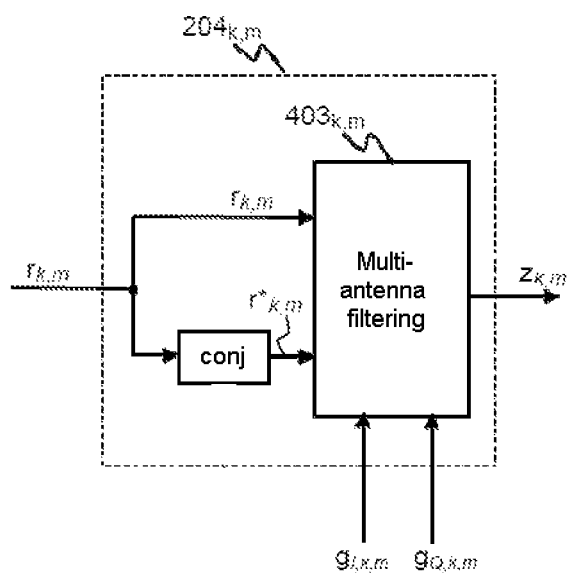
FIG. 7 is a diagram showing in detail the function of widely linear filtering in the FIG. 5 equalization function.

This filtering step is shown in FIG. 7.

The vector $r_{k,m}$ and its conjugate $r^*_{k,m}$ are filtered separately by a widely linear multi-antenna filter $403_{k,m}$ employing two equalizer filters $g_{I,k,m}$ and $g_{Q,k,m}$. Let $$\hat{r}_{k,m} = \begin{bmatrix} r_{k,m} \\ r^*_{k,m} \end{bmatrix} \quad (2)$$

denote the global vector containing the concatenation of the received signal after elimination of the estimate of interference with its conjugate:

The output of the filter step $403_{k,m}$ is given by the following expression $$z_{k,m} = g_{WL,k,m}^H \hat{r}_{k,m} = g_{I,k,m}^H r_{k,m} + g_{Q,k,m}^H r^*_{k,m} \quad (3)$$

$g_{WL,k,m}$ is a vector of size $2N_RM$ that represents the widely linear filter and that may also be described in an equivalent manner by the two filters $g_{I,k,m}$ and $g_{Q,k,m}$ each of size $N_RM$. The widely linear filter $g_{WL,k,m}$ therefore processes conjointly the signal and its conjugate. Note also that this filter contains an inverse Fourier transform operation. The equalized symbols obtained at the output of this filter are therefore delivered in the time domain.

There are two equivalent ways to express the signal $r_{k,m}$ after interference cancellation that yield two practical interpretations. The first formulation is $$r_{k,m} = H(I_K \otimes F_M)(\tilde{s} - E_{AP}[\tilde{s}]) + H(I_K \otimes F_M)e_{m+(k-1)M}s_{k,m} + w = \quad (4)$$
$$\mathcal{B}(\tilde{s} - E_{AP}[\tilde{s}]) + s_{k,m}\mathbf{b}_{k,m} + w$$

Because $E_{k,m}[s]=E_{AP}[s]-E_{AP}[s_{k,m}]e_{m+(k-1)M}=E_{AP}[\tilde{s}]$ as described above, $H(I_K \otimes F_M)E_{AP}[\tilde{s}]$ is the reconstructed (ISI and MUI) interference that is subtracted from the signal and $H(I_K \otimes F_M)e_{m+(k-1)M}s_{k,m}$ is the wanted signal (the wanted symbol) highlighted in the expression.

Figure 8:
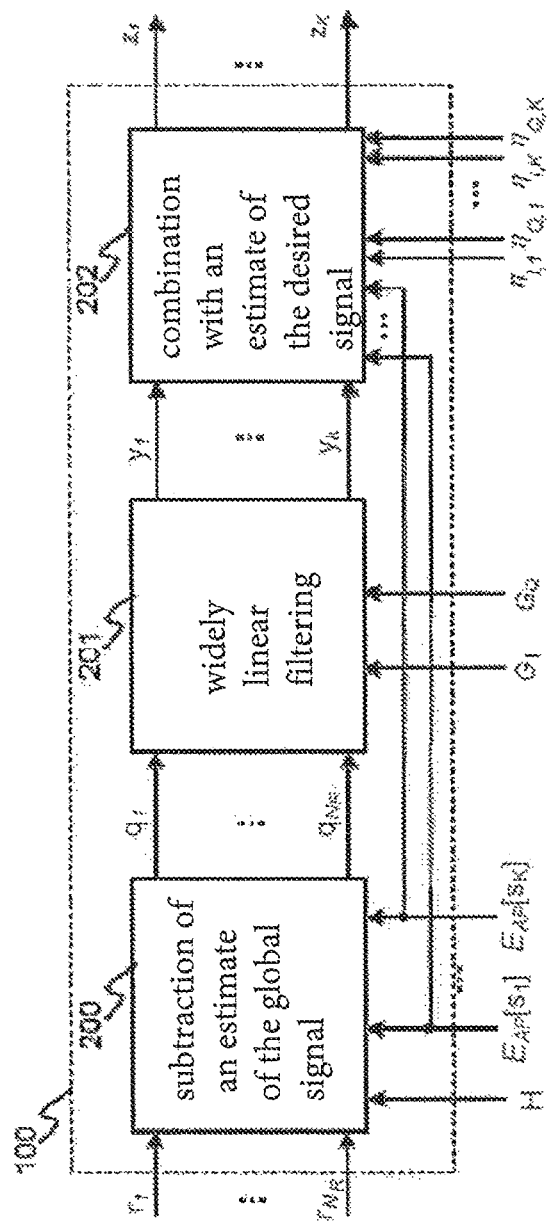
FIG. 8 is a block diagram of a turbo-equalizer in accordance with a second embodiment of the invention.

This expression gives the structure of the block 100 represented in FIG. 8. In particular, for each symbol to be decoded of each user, based on the soft information coming from the decoders, the turbo-equalizer in accordance with the invention reconstructs the interfering signal that is given by the sum of the signals of the other users (MUI interference) and the ISI interference reconstructed from the symbols of the user of interest minus the symbol that it is required to decode. This reconstructed global interfering signal is then subtracted from the total signal. The signal cleansed of interference then passes through a frequency domain equalizer that further improves the separation between users and equalizes the residual ISI interference.

The use of widely linear filtering, that is to say filtering that processes the signal and its conjugate separately via two equalizer filters enables a significant improvement in equalization performance over the usual kind of equalizer filter.

FIGS. 4 to 7 illustrate the general principle of the equalizer in accordance with a first embodiment of the invention in which an equalizer filter is applied to each symbol coming from each user.

The FIG. 4 theoretical diagram has the drawback of a high level of implementation complexity, however.

Described next is the equalization method in accordance with a second embodiment of the invention in which the processing, although functionally equivalent to that described above for the first implementation, has reduced implementation complexity.

Equation (4) may be rewritten with the following equivalent formulation:

$$r_{k,m} = r - H(I_K \otimes F_M)E_{AP}[s] + H(I_K \otimes F_M)e_{m+(k-1)M}E_{AP}[s_{k,m}] = \quad (5)$$
$$r - \mathcal{B}E_{AP}[s] + \boldsymbol{b}_{k,m}E_{AP}[s_{k,m}]$$

where
$$\mathcal{B} = H(I_K \otimes F_M)$$
$$\boldsymbol{b}_{k,m} = H(I_K \otimes F_M)e_{m+(k-1)M}$$

Equation (5) shows that the signal $r_{k,m}$ can be obtained from an estimate of the wanted symbol transmitted via the propagation channel $H(I_K \otimes F_M)e_{m+(k-1)M}E_{AP}[s_{k,m}]$ and corrected by the corrective term $q=r-H(I_K \otimes F_M)E_{AP}[s]$ in which the quantity $H(I_K \otimes F_M)E_{AP}[s]$ is an estimate of the global signal reconstructed from soft information coming from the decoders in the preceding iteration.

After filtering, the output of the equalizer filter may be expressed as the sum of the estimate of the wanted signal weighted by the coefficient $g_{I,k,m}^H \otimes_{k,m}$ and its conjugate weighted by the coefficient $g_{Q,k,m}^H \otimes_{k,m}^*$ and the corrective signal filtered by the equalizer:

$$z_{k,m} = \quad (6)$$
$$g_{WL,k,m}^H \hat{r}_{k,m} = g_{WL,k,m}^H \begin{bmatrix} (r - \mathcal{B}E_{AP}[s]) \\ (r - \mathcal{B}E_{AP}[s])^* \end{bmatrix} + g_{WL,k,m}^H \begin{bmatrix} \boldsymbol{b}_{k,m}E_{AP}[s_{k,m}] \\ \boldsymbol{b}_{k,m}^* E_{AP}[s_{k,m}^*] \end{bmatrix} =$$
$$g_{WL,k,m}^H \begin{bmatrix} q \\ q^* \end{bmatrix} + g_{I,k,m}^H \boldsymbol{b}_{k,m}E_{AP}[s_{k,m}] + g_{Q,k,m}^H \boldsymbol{b}_{k,m}^* (E_{AP}[s_{k,m}])^*$$

This interpretation leads to the embodiment of the turbo-equalizer proposed in FIG. 8 that comprises three steps 200, 201, 202.

In accordance with this second embodiment, instead of subtracting the MUI interference and the ISI interference from each wanted symbol of each user, the block 200 aims to subtract an estimate of the global signal (interference plus wanted signal) to obtain a corrective signal. This corrective signal is then filtered by the widely linear filter block 201 to increase the separation between users and to reduce further the ISI interference. The filtered corrective signal is then combined in block 202 with the estimate of the wanted signal obtained from the soft information at the output of the decoders in the preceding iteration, to improve the estimate of the final wanted signal progressively (iteration by iteration).

The FIG. 8 diagram is functionally equivalent to the method shown in FIG. 4 but enables a reduction of complexity thanks to the fact that the reconstruction of the received signal in the block 200 may be carried out block by block using a fast Fourier transform. This is possible when the aim is to reconstruct the received signal in its entirety, in other words the wanted signal and the interfering signal, but is no longer possible if the aim is to reconstruct only the interfering signal, as is the case in the first embodiment shown in FIGS. 4 to 7.

In accordance with the second embodiment, the equalizer 100 in accordance with the invention comprises a first block 200 for generating $N_R$ corrective signals $q_1, \ldots q_{NR}$, a second block 201 for widely linear filtering of the corrective signals in order to produce a set of K filtered corrective signals $y_1, \ldots y_k$, and a third block 202 for combining the filtered corrective signals with an estimate of the wanted signal in order to produce a set of K equalized signals $z_1, \ldots z_K$.

Figure 9:
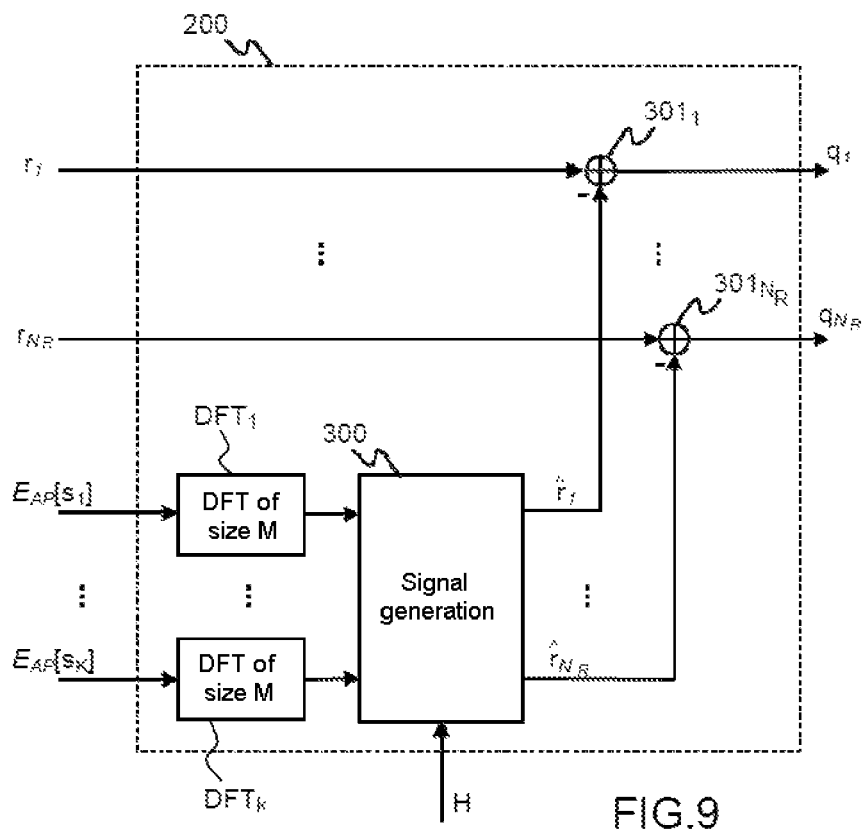
FIG. 9 is a diagram showing in detail the function of generating a corrective signal in the FIG. 8 turbo-equalizer.

The first block 200 subtracts from the received signal the signal reconstructed from information at the output of the soft mapping module. This first block 200 is shown in FIG. 9.

It converts into the frequency domain each vector of size M containing the soft estimates of the transmitted symbols $E_{AP}[s_k]$, $k=1, \ldots K$, via a discrete Fourier transform $DFT_1, \ldots DFT_K$, of size M. A module 300 then executes the subsequent operations. The vectors at the output of the discrete Fourier transforms are concatenated together, after which the concatenated vector is multiplied by the channel estimate matrix H and the output vector of size $N_R M$ is segmented into $N_R$ vectors of size M.

The signals at the output of the modules 300 represent an estimate of the received signals based on symbols reconstructed using the outputs of the decoders. They therefore include the MUI interference and the ISI interference, in other words all the sources of interference, as well as the wanted signal that is to be decoded. The operations $301_1, \ldots 301_{NR}$ effect a subtraction input by input between the received signals $r_1, \ldots r_{NR}$ and the estimated signals at the output of the module 300.

In the first iteration of the equalization process, the soft information coming from the decoder is initialized to zero, and the block 200 therefore does not modify the incoming signal: $q_n = r_n$. In the final iteration, assuming that the iterative receiver has converged toward correct estimates of the transmitted symbols, the reconstructed signal at the output of the module 300 corresponds to the signals transmitted via the filters of the propagation channels. The vectors $q_n$ therefore represent only noise. During the intermediate iterations, when the reconstructed total signals at the output of the module 300 are only a more or less good approximation of the signals actually received without noise, the block 200 produces corrective signals $q_n$ that, once filtered by the filter block 201 and summed with the soft estimates of the wanted signals by the block 202, make it possible for the signals $z_k$ to approach progressively the wanted signals actually transmitted (within the limit of the noise present, of course).

Figure 10:
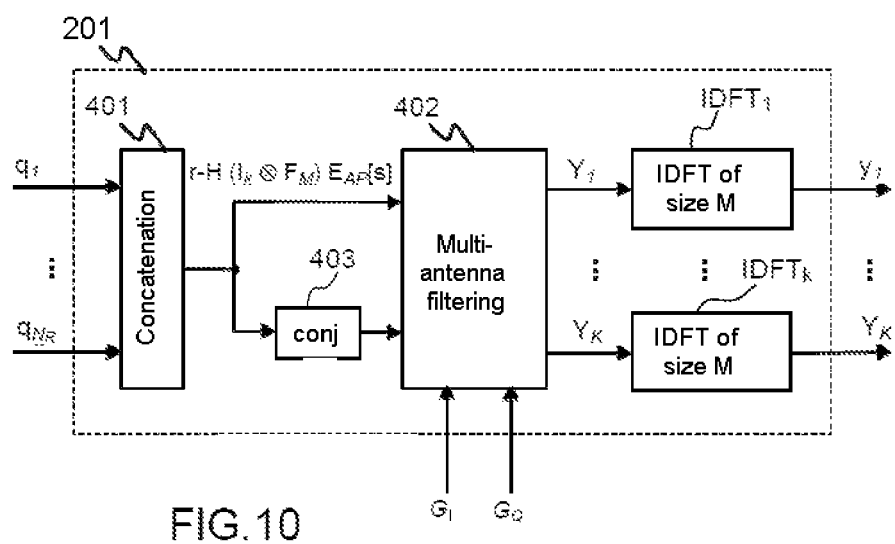
FIG. 10 is a diagram showing in detail the function of widely linear filtering in the FIG. 8 turbo-equalizer conforming to a first embodiment.

The second widely linear filter block 201 is shown in FIG. 10.

The $N_R$ corrective signals produced as output by the first block 200 and represented by vectors of size M are concatenated in the block 401 into a single vector q that may be written in the form: $q=r-H(I_K \otimes F_M)E_{AP}[s]$ and that is of size $N_R M$. $F_M$ is the Fourier transform matrix defined in the preamble to this description.

The vector q is then conjugated in the block 403 entry by entry to obtain the vector q*. The vectors q and q* are fed to the multi-antenna filter block 402 that effects the following operation:

$$Y = G_I^H q + G_Q^H q^* = \begin{bmatrix} G_I^H & G_Q^H \end{bmatrix} \begin{bmatrix} q \\ q^* \end{bmatrix} = G_{WL}^H \hat{q}; \quad G_{WL} = \begin{bmatrix} G_I \\ G_Q \end{bmatrix}, \hat{q} = \begin{bmatrix} q \\ q^* \end{bmatrix}$$

The filtering carried out is widely linear filtering, that is to say that the vector q and its conjugate q* are filtered separately.

The vector Y, of size MK, is then segmented into K vectors $Y_k$ of size M. The matrix operation may be effected efficaciously because the matrices each have only $N_R MK$ non-zero entries. The number K of users is assumed known or a hypothesis is taken as to this number.

Finally, the filtered vectors are converted into the time domain by K inverse Fourier transform modules $IDFT_1, \ldots IDFT_K$.

The FIG. 10 structure is a generic structure that may be applied to any type of constellation (real, quasi-rectilinear, complex).

Figure 11:
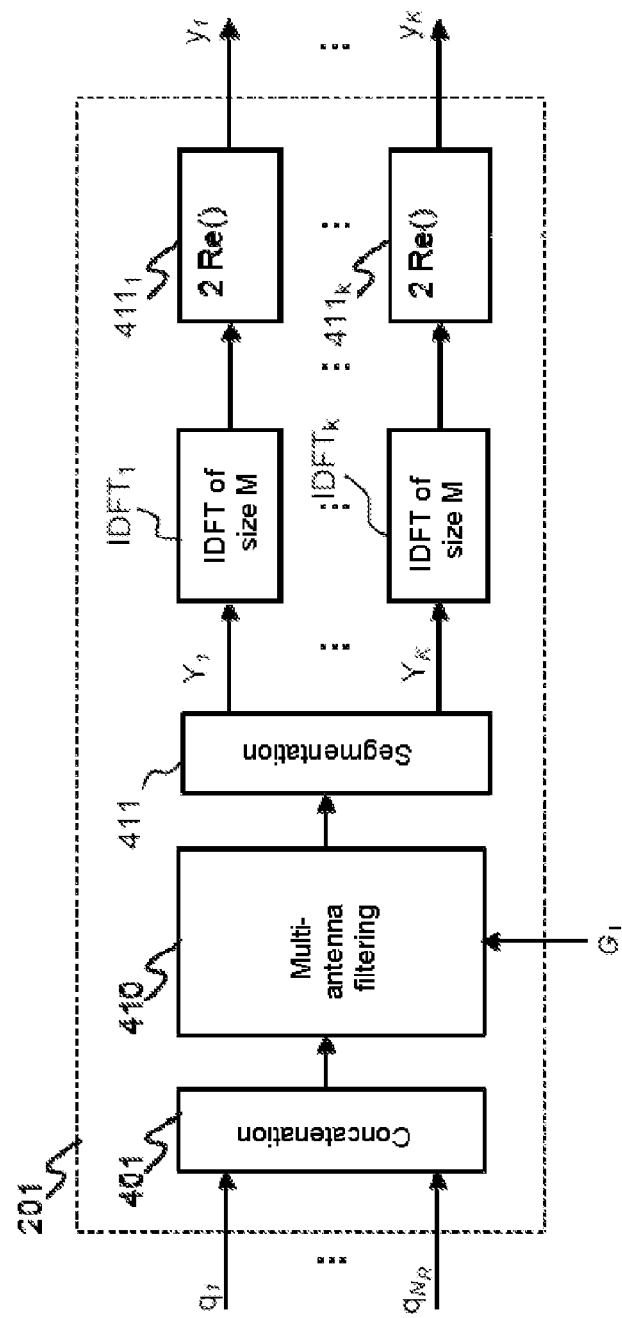
FIG. 11 is a diagram showing in detail the function of widely linear filtering in the FIG. 8 turbo-equalizer conforming to a second embodiment.

FIG. 11 shows an embodiment of the widely linear filter module 201 when the signal transmitted is modulated with a real constellation. In this case only, the FIG. 10 structure can be optimized to execute the same function but with a limited number of operations.

In fact, for real constellations it is possible to show that the filter $G_I$ that is intended to filter the corrective signal q and the filter $G_Q$ that is intended to filter the corrective filter q* are linked by the following equation:

$$G_Q = G^*_I (I_M \otimes J)$$

The matrix J is defined as follows:

$$J = F_M F_M^T = \begin{bmatrix} 1 & 0 & \cdots & 0 \\ 0 & \cdot\cdot\cdot & \cdot\cdot\cdot & 1 \\ \vdots & \cdot\cdot\cdot & \cdot\cdot\cdot & 0 \\ 0 & 1 & 0 & 0 \end{bmatrix}$$

Note that the following identities are true: $J = J^T = J^H = J^* = J^{-1}$. This matrix J represents the inversion of the frequency axis of a discrete and periodic signal. It may be assessed by applying a vector as input and looking at the output. The multiplication by this matrix may be implemented by permutations.

Denoting q the vector obtained by concatenation of all the vectors $q_n$, $n=1, \ldots, N_R$, and y the vector obtained by concatenation of the vectors $y_k$, $k=1, \ldots, K$, using the preceding property the equalized symbols vector may be written as follows $$Y = G_I^H q + (I_M \otimes J)(G_I^H)^*(I_M \otimes J)(I_M \otimes J) q^*$$

The above expression may be interpreted as filtering followed by an operation of extraction of the real part. Indeed, the filter represented by the block diagonal matrix $G_I$ in the frequency domain has an impulse response in the time domain that can be expressed by a block circulant matrix $G_{I,t} = (I_K \otimes F_M^H) G_I (I_K \otimes F_M)$. The frequency response of the conjugate filter $G^*_{I,t}$ is $(I_M \otimes J)(G_I^H)^*(I_M \otimes J)$. Moreover, if $q_t = (I_K \otimes F_M^H) q$ is the real signal in the time domain, then in the frequency domain the following identity is true $(I_K \otimes F_M) q^*_t = (I_M \otimes J) q^*$. This completes the proof.

In accordance with the second embodiment applicable to real constellations and shown in FIG. 11, the filter module 201 therefore comprises a first module 401 for concatenating the input vectors to obtain the single vector q, a module 410 for filtering the corrective signal q from the equalizer filter $G_I$, a module 411 for segmenting the filtered corrective signal into K vectors $y_k$, $k=1, \ldots, K$ which are then each converted into the time domain via an inverse Fourier transform $IDFT_k$. Finally, a final module $411_k$ extracts the real part of each entry of each vector and multiplies by 2 to supply the equalized corrective signals.

Figure 12:
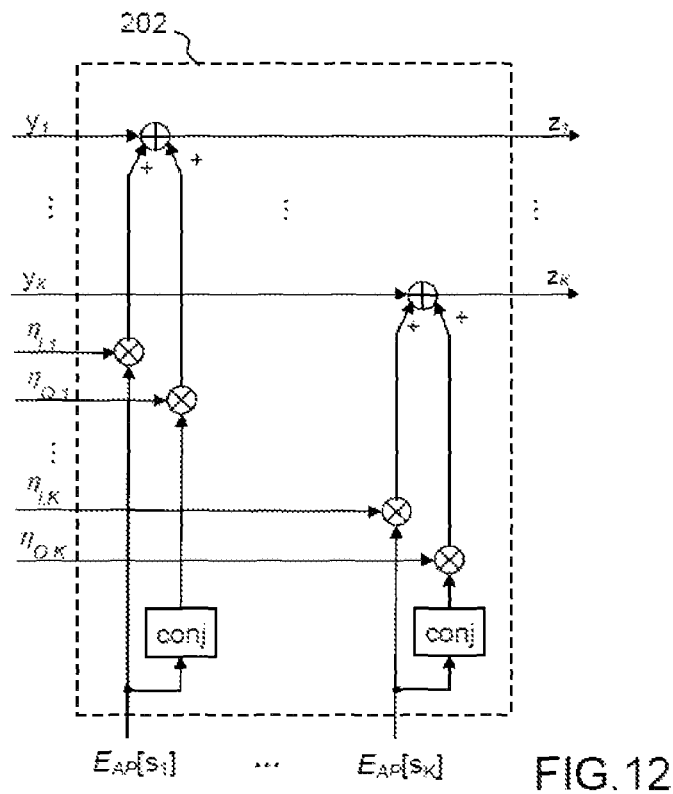
FIG. 12 is a diagram showing in detail the function of combination with an estimate of the wanted signal in the FIG. 8 turbo-equalizer for the general case of a signal modulated in accordance with a complex constellation.

FIG. 12 shows the third block 202 for combining the filtered corrective signals with an estimate of the wanted signal.

The block 202 adds to each output of the filter block 201 an estimate of the wanted signals weighted by the factors $\eta_{I,k}$ and $\eta_{Q,k}$ for $k=1, \ldots, K$, which represent the amplitude of the wanted component of the signal and the conjugate signal of each user after equalization. The function of the block 202 is therefore to add to the filtered corrective signals at the output of the filter block 201 the estimates of the wanted signals obtained from the soft information from the decoders, calculated in the preceding iteration and weighted by the estimates of the amplitudes $\eta_{I,k}$ and $\eta_{Q,k}$.

In the first iteration, the soft information coming from the decoders is null. Like the block 200, the block 202 therefore has no effect in the first iteration of the method and the output of the filter block 201 constitutes the estimate of the wanted signals that is used.

In the final iteration, assuming that the iterative receiver has converged toward correct estimates of the transmitted symbols, the block 202 adds a noise term coming from the filter 201. In the intermediate iterations the function of the block 202 is to improve the estimate of the wanted signal using the corrective signal at the output of the filter 201.

Figure 13:
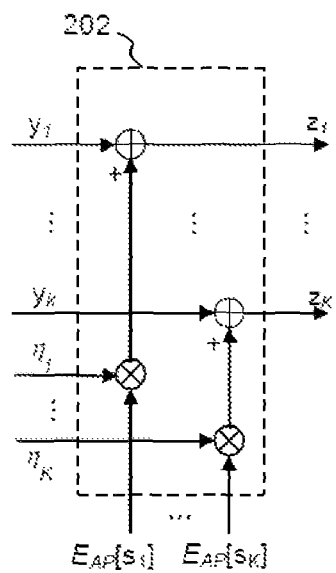
FIG. 13 is a diagram showing in detail the function of combination with an estimate of the wanted signal in the FIG. 8 turbo-equalizer for the particular case of a signal modulated in accordance with a real constellation.

When the transmitted signal is modulated with a real constellation, the block 202 for combination with the estimates of the wanted signals takes a simplified form as shown in FIG. 13.

Because the reconstructed signal is real, the amplitudes $\eta_{I,k}$ and $\eta_{Q,k}$ may be summarized in a single factor $\eta_k$ for $k=1, \ldots, K$, which represents the amplitude of the wanted component of the signal of each user after equalization. A single coefficient is therefore sufficient. The logical and functional description of the block 202 is therefore the same as for the general case of complex constellations.

The steps necessary for calculating the equalizer filter or filters used by the multi-antenna filtering step 402, 410 of the widely linear filter block 201 of the equalizer in accordance with the invention are described in detail next.

Described first is the calculation of the equalizer filters in the general case of a signal modulated with a complex constellation. There are then distinguished successively real constellations of the M-PAM or BPSK type, on the one hand, and rotated real constellations of the M-PAM or BPSK type known as π/2-M-PAM or π/2-BPSK constellations.

Figure 14:
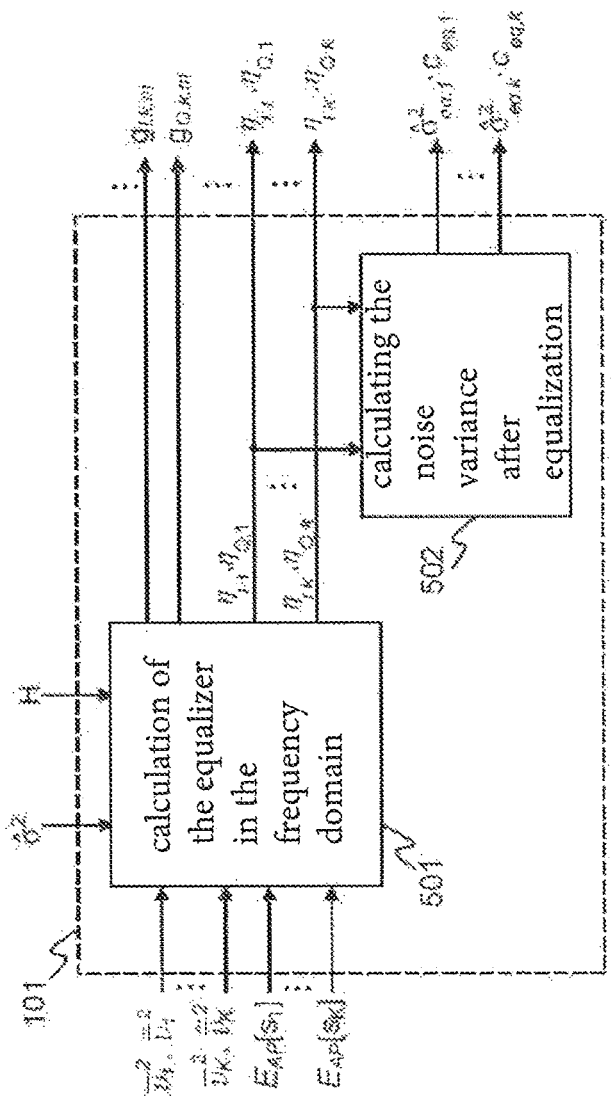
FIG. 14 is a block diagram of the function of calculating the coefficients of the equalizer in the general case of a signal modulated in accordance with a complex constellation.

FIG. 14 shows the module 101 for calculating the coefficients of the equalizer in accordance with a first embodiment applicable to complex constellations.

This module 101 includes a first block 501 for calculating the equalizer in the frequency domain and calculating an estimate of the amplitude of the wanted symbols.

The module 101 also includes a second block 502 for calculating the noise variance after equalization. To be more precise, the block 502 determines the covariances and pseudo-covariances of the signal after equalization. Its implementation is therefore not commented on further here as it concerns calculation principles known to a person skilled in the art.

The first block 501 calculates an equalizer in accordance with the minimum mean square error (MMSE) criterion. In contrast to a zero-forcing equalizer, the aim of which is to cancel interference perfectly, the aim of this MMSE equalizer is to reduce MUI and ISI interference if possible down to the level of noise. To achieve this, this equalizer uses the degrees of freedom that it has at the level of its frequency response to limit ISI interference of each user. It also uses the spatial degrees of freedom resulting from the number of receiving antennas to limit the MUI interference and the degrees of freedom linked to the statistical properties of the non-circular signals to limit further MUI interference.

The technique is described hereinafter as far as highlighting the location at which a widely linear multi-user approach is used, with multiple antennas, which is one of the innovative aspects of the present invention.

The global vector $\hat{r}_{k,m}$ contains the concatenation of the received signal $r_{k,m}$ after elimination of the estimate of the interference with its conjugate. The MMSE filter that receives as input all the samples of global received signal after elimination of the interference estimate $\hat{r}_{k,m}$ and supplies as output the $m^{th}$ symbol of the $k^{th}$ user after equalization is written in this instance according to the general formula of an MMSE equalizer $$g_{WL,k,m} = \begin{bmatrix} g_{I,k,m} \\ g_{Q,k,m} \end{bmatrix} = C_{\hat{r}_{k,m}}^{-1} C_{\hat{r}_{k,m} s_{k,m}} \quad (7)$$

where $C_{\hat{r}_{k,m}}$ is the covariance matrix of $\hat{r}_{k,m}$ and $C_{\hat{r}_{k,m} s_{k,m}}$ is the cross-covariance vector of $\hat{r}_{k,m}$ and of the $m^{th}$ symbol $s_{k,m}$ of the $k^{th}$ user.

Note that $$C_{\hat{r}_{k,m}} = E[(\hat{r}_{k,m} - E_{AP}[\hat{r}_{k,m}])(\hat{r}_{k,m} - E_{AP}[\hat{r}_{k,m}])^H] \quad (8)$$

$$= E[\hat{r}_{k,m} \hat{r}_{k,m}^H]$$

$$= \begin{bmatrix} C_{r_{k,m}} & \tilde{C}_{r_{k,m}} \\ \tilde{C}_{r_{k,m}}^* & C_{r_{k,m}}^* \end{bmatrix}$$

and $$C_{\hat{r}_{k,m} s_{k,m}} = \begin{bmatrix} C_{r_{k,m} s_{k,m}} \\ \tilde{C}_{r_{k,m} s_{k,m}}^* \end{bmatrix} \quad (9)$$

The above expressions show that the covariance and the cross-covariance calculated on the global signal $\hat{r}_{k,m}$ naturally produce the covariance and the pseudo-covariance of the received signal $r_{k,m}$ after interference cancellation as well as the cross-covariance and cross-pseudo-covariance of the signal $r_{k,m}$ with the symbol $s_{k,m}$ that the aim is to equalize.

Starting from expression (5) for $r_{k,m}$ it is possible to show that the covariance matrix of $r_{k,m}$ has the following form $$C_{r_{k,m}} = E_{k,m}[r_{k,m} r_{k,m}^H] \quad (10)$$

$$= (E_s - \bar{v}_k^2) \mathbf{b}_{k,m} \mathbf{b}_{k,m}^H +$$

$$\mathcal{B}(\text{diag}(\bar{v}_0^2, \ldots, \bar{v}_{K-1}^2) \otimes I_M) \mathcal{B}^H + \hat{\sigma} I_{N_R M}$$

$$= (E_s - \bar{v}_k^2) \mathbf{b}_{k,m} \mathbf{b}_{k,m}^H + \Sigma_{1,1}$$

and that the pseudo-covariance matrix of $r_{k,m}$ has the following form $$\tilde{C}_{r_{k,m}} = E_{k,m}[r_{k,m} r_{k,m}^T] \quad (11)$$

$$= (\tilde{E}_s - \tilde{v}_k^2) \mathbf{b}_{k,m} \mathbf{b}_{k,m}^T +$$

$$\mathcal{B}(\text{diag}(\tilde{v}_0^2, \ldots, \tilde{v}_{K-1}^2) \otimes I_M) \mathcal{B}^T$$

$$= (\tilde{E}_s - \tilde{v}_k^2) \mathbf{b}_{k,m} \mathbf{b}_{k,m}^T + \Sigma_{1,2}$$

in which the estimates of covariance and pseudo-covariance based on the soft information supplied by the decoders are calculated as follows:

$$\bar{v}_k^2 = \frac{1}{M} \sum_{m=1}^M v_{k,m}^2, k = 1, \ldots, K$$

$$\tilde{v}_k^2 = \frac{1}{M} \sum_{m=1}^M \tilde{v}_{k,m}^2, k = 1, \ldots, K$$

where $v_{k,m}^2 = E_{AP}[|s_{k,m} - E_{AP}[s_{k,m}]|^2]$, $\tilde{v}_{k,m}^2 = E_{AP}[(s_{k,m} - E_{AP}[s_{k,m}])^2]$ and $E_s = E_{k,m}[|s_{k,m}|^2]$ for all k and m and $\tilde{E}_s = E_{k,m}[s_{k,m}^2]$ for all indices k and m. Note that $E_s$ and $v_{k,m}^2$ are real numbers and that $\tilde{E}_s$ and $\tilde{v}_{k,m}^2$ are generally complex numbers. For real constellations $\tilde{E}_s = E_s$, $\tilde{v}_{k,m}^2$, $c_{r_{k,m}}$ and $\tilde{c}_{r_{k,m}}$ are matrices of size $N_R M \times N_R M$. The presence of multiple users is indicated by the matrix $(\text{diag}(\bar{v}_0^2, \ldots, \bar{v}_{K-1}^2) \otimes I_M)$ that is of size $KM \times KM$ and its counterpart for the pseudo-covariance matrix, and by the matrix $\mathcal{B}$ $8 = H(I_K \otimes F_M)$ which is of size $N_R M \times KM$. Note also that the terms $\bar{v}_k^2$ and $\tilde{v}_k^2$ define the influence of the soft information coming from the decoders on the expression of the equalizer. These values notably yield the estimate of the variances and the pseudo-variances of the transmitted symbols. In the first iteration, $\bar{v}_k^2 = E_s$ and $\tilde{v}_k^2 = \tilde{E}_s$ and there is obtained the non-iterative widely linear MMSE space-frequency filter (that is to say in the absence of information coming from the decoder).

The cross-covariance and cross-pseudo-covariance matrices between $r_{k,m}$ and the symbols $s_{k,m}$ are equal to $$c_{r_{k,m} s} = E_{k,m}[r_{k,m} s_{k,m}^*] = E_s \otimes_{k,m}$$

$$\tilde{c}_{r_{k,m} s} = E_{k,m}[r_{k,m} s_{k,m}] = \tilde{E}_s \otimes_{k,m} \quad (12)$$

They are vectors of size $N_R M$.

It should be noted here that the cross-pseudo-covariance matrix is calculated as a function of the pseudo-covariance $\tilde{E}_s$ of the transmitted symbols, which is non-null for modulation having a constellation verifying the property of so-called non-circularity as explained at the beginning of the present description.

Using equations (10), (11), (12), the equalizer filter may be written $$g_{WL,k,m} = \tag{13}$$

$$\left\{\hat{\Sigma} + \begin{bmatrix} b_{k,m} & 0 \\ 0 & b^*_{k,m} \end{bmatrix} \begin{bmatrix} (E_s - \bar{v}_k^2) & (\tilde{E}_s - \tilde{\bar{v}}_k^2) \\ (\tilde{E}_s - \tilde{\bar{v}}_k^2)^* & (E_s - \bar{v}_k^2)^* \end{bmatrix} \begin{bmatrix} b^H_{k,m} & 0 \\ 0 & b^T_{k,m} \end{bmatrix}\right\}^{-1}$$

$$\begin{bmatrix} b_{k,m} & 0 \\ 0 & b^*_{k,m} \end{bmatrix} \begin{bmatrix} E_s \\ \tilde{E}^*_s \end{bmatrix}$$

The preceding expression is valid for any complex or real constellation. The terms $(E_s - \bar{v}_k^2)$ and $(\tilde{E}_s - \tilde{\bar{v}}_k^2)$ measure the progress of the convergence. In the first iteration they are null, in the final iteration $\hat{\Sigma} = \hat{\sigma} I_{2N_RM}$ and the matrix in the middle has the value $$\begin{bmatrix} E_s & \tilde{E}_s \\ \tilde{E}^*_s & E_s \end{bmatrix}.$$

Note that the equalizer filter is a vector of size $2N_RM$ and may also be written in the form $$g_{WL,k,m} = \begin{bmatrix} g_{I,k,m} \\ g_{Q,k,m} \end{bmatrix}.$$

$g_{I,k,m}$ and $g_{Q,k,m}$ are vectors of size $N_RM$ that respectively filter the signals and their conjugates and constitute one of the outputs of the block 501 for any k and any m.

The matrix $\hat{\Sigma}$ is defined by $$\hat{\Sigma} = E_{k,m}[(\hat{r} - E_{AP}[\hat{r}])(\hat{r} - E_{AP}[\hat{r}])^H] = \tag{14}$$

$$E_{k,m}[\hat{r}\hat{r}^H] = \begin{bmatrix} C_r & \tilde{C}_r \\ \tilde{C}^*_r & C^*_r \end{bmatrix} = \begin{bmatrix} \Sigma_{1,1} & \Sigma_{1,2} \\ \Sigma^*_{1,2} & \Sigma^*_{1,1} \end{bmatrix}$$

The matrix $\Sigma_{1,1}$ represents the covariance matrix of the received signal r formed by the concatenation of the vectors $r_n$ at the input of the block 100. The vector r is written in the following form:

$$r = H(I_K \otimes F_M)s + w$$

in which s is formed by the concatenation of the blocks of data $s_k$ of the K users and w is a complex Gaussian white noise vector of null mean and the variance of which is estimated as $\hat{\sigma}$. The covariance matrix may therefore be written as follows $$\Sigma_{1,1} = E_{AP}[(r - E_{AP}[r])(r - E_{AP}[r])^H]$$

where $E_{AP}[\ ]$ is the mathematical expectation calculated using the a priori information coming from the decoders and calculated during the preceding iteration.

In the first iteration this a priori information is set at zero and the covariance matrix takes the following form $$\Sigma_{1,1} = E_s HH^H + \hat{\sigma} I_{N_RM}$$

in which $E_s = E[|s_k(m)|^2]$ for all $k = 1, \ldots, K$ and $m = 1, \ldots, M$.

The covariance is a measure of the correlation between the variation of the signal relative to its mean and the same variation conjugated. It is assumed here that the symbols transmitted by the K users are independent between users and the symbols of each user are independent. This is expressed by the fact that $E[s_k s_k^H] = E_s I_M$, for each user, and $E[ss^H] = E_s I_{MK}$, for the global signal. After passing through the channel, the terms H in the correlation illustrate the fact that the multi-antenna channel (between the users and the antennas of the receiver) introduces a correlation, a link between the received signals. This expresses the fact that the channels between the users and the receiver are not independent "tubes", and that there is interference between antennas. In fact the matrix $\Sigma_{1,1}$ is a block diagonal matrix, but has non-null terms off the main diagonal.

In successive iterations the covariance matrix of the received signal takes the following form $$\Sigma_{1,1} = B(\text{diag}(\bar{v}_0^2, \ldots, \bar{v}_{K-1}^2) \otimes I_M)B^H + \hat{\sigma} I_{N_RM} \tag{15}$$

$$= H(\text{diag}(\bar{v}_1^2, \ldots, \bar{v}_k^2, \ldots, \bar{v}_K^2) \otimes I_M)H^H + \hat{\sigma} I_{N_RM}$$

This expression is valid for any constellation.

The multi-user aspect is more clearly defined on calculating the $N_R \times N_R$ blocks of size $M \times M$ of the matrix $\Sigma_{1,1}$:

$$[\text{block }(p,q)de\Sigma_{1,1}]_{p,q=1,\ldots,N_R} = \tag{16}$$

$$\left[\sum_{k=0}^{K-1} \bar{v}_k^2 H_{p,k} H_{q,k}^H\right]_{p,q=1,\ldots,N_R} + \delta_{p-q}\hat{\sigma} I_{\wedge}$$

in which $\delta_p = 1$ if $p = 0$ and $\delta_p = 0$ otherwise. The blocks can be calculated quickly because the matrices $H_{p,k}$ are diagonal matrices. Moreover $\Sigma_{1,1}$ is Hermitian ($\Sigma_{1,1} = \Sigma_{1,1}^H$).

The matrix $\Sigma_{1,2}$ represents the pseudo-covariance matrix of the received signal r $$\Sigma_{1,2} = E_{AP}[(r - E_{AP}[r])(r - E_{AP}[r])^T]$$

The pseudo-covariance is a measure of the correlation between the signal (without its mean, thus the variation of the signal) with the same variation. Because a complex signal is formed of a real part and an imaginary part, therefore of two random variables, two equations are needed to define the statistical behaviour of a complex signal. Complex signals the distribution whereof shows central symmetry about the origin (known as circularity) have a null pseudo-covariance.

By introducing the received signal model into the definition of the pseudo-covariance matrix it is possible to write (assuming complex Gaussian noise with circular symmetry, which yields a null pseudo-covariance for this noise)

$$\Sigma_{1,2} = H(I_K \otimes F_M)E_{AP}[(s - E_{AP}[s])(s - E_{AP}[s])^T](I_K \otimes F_M^T)H^T + E_{AP}[ww^T]$$

$$== H(I_K \otimes F_M)\tilde{C}_s(I_K \otimes F_M^T)H^T$$

The dependency of the pseudo-covariance $\tilde{c}_s$ of the transmitted signal has been explained to highlight the impact of the form and the statistic of the transmitted symbols. This pseudo-covariance changes according to the constellation and therefore gives different implementations and also different simplification possibilities in calculating the equalizer as a function of the form of the covariance.

Because all the symbols have the same pseudo-covariance (the fundamental but limiting hypothesis that has been adopted) in the first iteration, the pseudo-covariance matrix of the received signal then becomes $$\Sigma_{1,2} = \tilde{E}_s H(I_K \otimes F_M)(I_K \otimes F_M^T)H^T + E_{AP}[ww^T] \quad (17)$$
$$== \tilde{E}_s H(I_K \otimes (F_M F_M^T))H^T$$
$$= \tilde{E}_s H(I_K \otimes J)H^T$$

which in fact represents the pseudo-covariance of the symbols in the frequency domain normalized by the value $\tilde{E}_s$.

There has been defined $$J = F_M F_M^T = \begin{bmatrix} 1 & 0 & \cdots & 0 \\ 0 & \cdot & \cdot & 1 \\ \vdots & \cdot & \cdot & 0 \\ 0 & 1 & 0 & 0 \end{bmatrix} \quad (18)$$

It should be noted here that the pseudo-covariance matrix of the received signal depends on the pseudo-covariance $\tilde{E}_s$ of the transmitted symbols which is non-null for modulation having a constellation verifying the property of so-called non-circularity as explained at the beginning of the present description.

In successive iterations the pseudo-covariance matrix of the received signal may be written $$\Sigma_{1,2} = \mathcal{B}(diag(\tilde{v}_0^2, \ldots, \tilde{v}_{K-1}^2) \otimes I_M)\mathcal{B}^T = $$
$$H(diag(\tilde{v}_0^2, \ldots, \tilde{v}_{K-1}^2) \otimes J)H^T \quad (19)$$

The multi-user aspect is more clearly defined on calculating the $N_R \times N_R$ blocks of size M×M of the matrix $\Sigma_{1,2}$ which are written:

$$[\text{block }(p,q)\text{ of }\Sigma_{1,2}]_{p,q=1,\ldots,N_R} = \left[\sum_{k=0}^{K-1} \tilde{v}_{p,k}^2 H_{p,k} J H_{q,k}^T\right]_{p,q=1,\ldots,N_R} \quad (20)$$

and can be calculated quickly because the matrices $H_{p,k}$ are diagonal matrices. Moreover $\Sigma_{1,2}$ is a complex symmetrical matrix ($\Sigma_{1,2}^T = \Sigma_{1,2}$).

The covariance and pseudo-covariance matrices make it possible to characterize completely the second order statistic of a complex signal. For circular signals (e.g. considering a symmetrical QAM constellation), the pseudo-covariance is null. The covariance and pseudo-covariance matrices calculated here make it possible to take the multi-user aspect into account.

The estimates of the amplitudes of the wanted signal and its conjugate can be calculated as follows:

$$\eta_{I,k} = g_{I,k,m}^H \otimes_{k,m}; \eta_{Q,k} = g_{Q,k,m}^H \otimes_{k,m}^*$$

Note that the index of the symbol m is omitted because it can be shown that this quantity is independent of the symbol index and depends only on the index of the user. Any index m may therefore be chosen for the calculation. Efficacious ways of calculating these quantities exist, but they are not described in detail here for complex constellations. They are described for real constellations.

Figure 15:
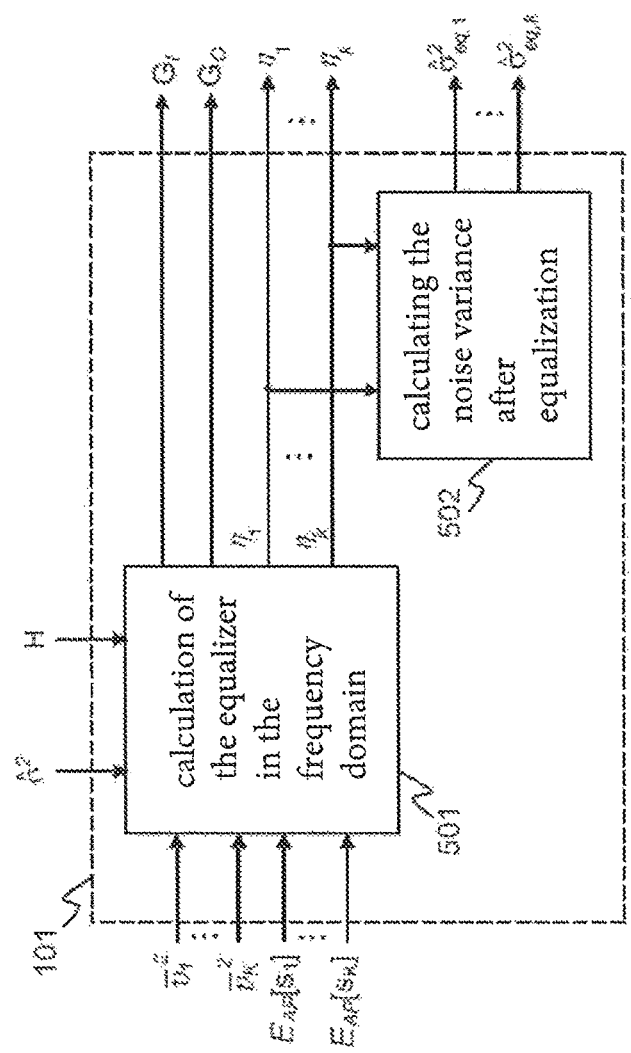
FIG. 15 is a block diagram of the function of calculating the coefficients of the equalizer in the particular case of a signal modulated in accordance with a real constellation.

FIG. 15 represents the functional diagram of the calculation of the equalizer in the case of signals modulated by real constellations of M-PAM or BPSK type. The constraint imposing real constellations makes it possible to simplify the implementation of the block 101.

In the case of real constellations, the expression (13) for the equalizer is simplified by the following expression $$g_{WL,k,m} = E_s \left\{ \hat{\Sigma} + (E_s - \hat{v}_k^2) \begin{bmatrix} \tilde{b}_{k,m} \\ \tilde{b}_{k,m}^* \end{bmatrix} [\tilde{b}_{k,m}^H \quad \tilde{b}_{k,m}^T] \right\}^{-1} \begin{bmatrix} \tilde{b}_{k,m} \\ \tilde{b}_{k,m}^* \end{bmatrix} \quad (21)$$
$$= E_s \{\hat{\Sigma} + (E_s - \hat{v}_k^2) \tilde{b}_{k,m} \tilde{b}_{k,m}^H\}^{-1} \tilde{b}_{k,m}$$

The preceding expression may be simplified as follows $$g_{WL,k,m} = \frac{E_s}{1+\lambda_k} \hat{\Sigma}^{-1} \tilde{b}_{k,m}, \quad (22)$$
$$\lambda_k = (E_s - \hat{v}_k^2) \tilde{b}_{k,m}^H \hat{\Sigma}^{-1} \tilde{b}_{k,m}$$

The filter for symbol m of user k depends on the soft information via the matrix $\hat{\Sigma}$, because this matrix contains the estimates of the covariances of the transmitted symbols, and via the factor $1+\lambda_k$, which is a factor of normalization of the energy of the filter that also depends on the soft information coming from the decoders. These factors $\lambda_k$ are independent of the index m of the symbol and depend only on the user. This makes it possible to assemble one filter per user by combining the filters of all the symbols of the user concerned $$G_{WL,k} = \frac{E_s}{1+\lambda_k} \hat{\Sigma}^{-1} \begin{bmatrix} H \\ H*(I_K \otimes J) \end{bmatrix} (e_K \otimes F_M)$$

This filter, which has a size of $2N_R M \times M$, may be conveniently calculated using the property that the matrices have a block diagonal structure or the specific structure of the matrix J. Note that the matrix $(e_K \otimes F_M)$ represents the inverse transform (when the filter is applied) from the time domain to that of the frequency domain and the other terms represent the frequency domain filter as such.

By concatenating together all the filters of the users there is obtained the matrix of size $2N_R M \times KM$ of the global filter which may therefore be written $$G_{WL} = G_{WL}(I_K \otimes F_M)$$

in which the term $(I_K \otimes F_M)$ indicates the set of inverse DFT at the filter output. $G_{WL}$ is the matrix of size $2N_R M \times KM$ of the frequency domain filter $$G_{WL} = \begin{bmatrix} G_I \\ G_Q \end{bmatrix} = E_s \hat{\Sigma}^{-1} \begin{bmatrix} H \\ H*(I_K \otimes J) \end{bmatrix} (D \otimes I_M) \quad (23)$$

and $$D = \text{diag}\left(\frac{1}{1+\lambda_0}, \ldots, \frac{1}{1+\lambda_{K-1}}\right).$$

is the diagonal matrix of size K×K that collects the real normalization factors of the various users. In the first iteration, when there is no soft information from the decoder, $\tilde{v}_k^2 = E_s$ and $\lambda_k = 0$ and therefore the matrix D is the identity of size K×K, which indicates that there is no influence of the a priori information on the calculation of the equalizer in the first iteration.

It is possible to calculate this filter efficaciously by noting that $$\hat{\Sigma} = \begin{bmatrix} \Sigma_{1,1} & \Sigma_{1,2} \\ \Sigma^*_{1,2} & \Sigma^*_{1,1} \end{bmatrix}$$

The covariance matrix of the received signal, in the case of real constellations, is then written in the first iteration $$\Sigma_{1,1} = E_s H H^H + \hat{\sigma} I_{N_R M} \quad (24)$$

and in successive iterations)

$$\Sigma_{1,1} = H(diag(\overline{v}_1^2, \ldots, \overline{v}_k^2, \ldots \overline{v}_K^2) \otimes I_M) H^H + \hat{\sigma} I_{N_R M}$$

In the first iteration a priori information is not defined and the pseudo-covariance matrix takes the following form $$\Sigma_{1,2} = E_s H (I_K \otimes J) H^T$$

in which $\tilde{\Sigma}_s = E[(s_k(m))^2]$ is the pseudo-covariance of the symbol $s_k(m)$ and it is assumed here that it is equal for all $k=1, K$ and $m=1, \ldots, M$. Note that for real constellations (this derivation applies in this case) such as BPSK and PAM, the following equation is true: $\tilde{E}_s = E_s$. The matrix J is defined as follows:

$$J = F_M F_M^T = \begin{bmatrix} 1 & 0 & \cdots & 0 \\ 0 & \cdot\cdot & \cdot\cdot & 1 \\ \vdots & \cdot\cdot & \cdot\cdot & 0 \\ 0 & 1 & 0 & 0 \end{bmatrix}$$

In successive iterations, when the soft information coming from the decoders is non-null, the pseudo-covariance takes the form $$\Sigma_{1,2} = H(diag(\overline{v}_1^2, \ldots, \overline{v}_k^2, \ldots, \overline{v}_K^2) \otimes J) H^T$$

Note that here the terms $\overline{v}_k^2$ are equal to those present in the covariance matrix simply because for real constellations $(s_k(m))^2 = |s_k(m)|^2$; this is not true in general.

Note that $\Sigma_{1,1}$ is a block diagonal matrix and that $\Sigma_{1,2}$ is a block matrix in which each block has the structure of the matrix J. This is referred to hereinafter as a matrix having a J block structure.

From the covariance matrix $\hat{\Sigma}$ of the received signal concatenated with its conjugate $\hat{r}$, the function calculates the blocks of the following inverse matrix, which is necessary for calculating the final equalizer derived in accordance with the minimum mean square error (MMSE) criterion:

$$\hat{\Sigma}^{-1} = \begin{bmatrix} S_1 & S_2 \\ S_2^* & S_1^* \end{bmatrix}$$

which may be calculated either on the global matrix or using the identity $$\begin{bmatrix} A & B \\ C & D \end{bmatrix}^{-1} = \begin{bmatrix} (A - BD^{-1}C)^{-1} & -(A - BD^{-1}C)^{-1}BD^{-1} \\ -(D - CA^{-1}B)^{-1}CA^{-1} & (D - CA^{-1}B)^{-1} \end{bmatrix}$$

In this instance the blocks are written as follows $$S_1 = (\Sigma_{1,1} - \Sigma_{1,2} \Sigma^*_{1,1}{}^{-1} \Sigma^*_{1,2})^{-1}$$

$$s_2 = -s_1 \Sigma_{1,2} \Sigma^*_{1,1}{}^{-1} \quad (25)$$

Note that, given the structure of the matrices in question, the inversions amount to calculating M times matrix inversions of size $N_R \times N_R$. Note further that $\hat{\Sigma}^{-1}$ is Hermitian. Then $s_1^H = s_1$ is also Hermitian and $s_2^T = s_2$ is symmetrical and complex. These matrices are used to form the final equalization matrices.

$$G_{WL} = E_s \begin{bmatrix} G_I \\ G_Q \end{bmatrix} = \begin{bmatrix} S_1 & S_2 \\ S_2^* & S_1^* \end{bmatrix} \begin{bmatrix} H \\ H * (I_K \otimes J) \end{bmatrix} (D \otimes I_M) = \quad (26)$$

$$E_s \begin{bmatrix} S_1 H (D \otimes I_M) + S_2 H^* (D \otimes J) \\ S_2^* H (D \otimes I_M) + S_1^* H^* (D \otimes J) \end{bmatrix}$$

Note that here also the matrices of the equalizer can be calculated quickly because they are products of block diagonal matrices or J block structure matrices. The coefficients of the equalizer $G_Q$ can be calculated from those of $G_I$ by simple conjugation and permutation. In fact, in the case of real constellations, $G_Q = G^*_I (I_M \otimes J), J)$. Only the matrix $G_I$ is therefore necessary. The term Es is a design factor of the modulation constellation employed. It may be taken as equal to 1.

Moreover, the following matrices are defined that can be calculated taking into account the diagonal or J block structure:

$$\Lambda_1 = H^H S_1 H; \; \Lambda_2 = H^T S^*_2 H. \quad (27)$$

Then the coefficients $\lambda_k$, $k=1, \ldots, K$, that measure the influence on the equalizer of the soft information coming from the decoders are written:

$$\lambda_k = \frac{2(E_s - \overline{v}_k^2)}{M} \operatorname{Re}[tr([\Lambda_1]_{k,k}) + tr(J[\Lambda_2]_{k,k})]. \quad (28)$$

Note that the preceding coefficients are independent of m and can be calculated once only for all the symbols in an efficacious manner, simply by using the diagonal coefficients of the block diagonal matrices $\Lambda_1$ and $(I_K \otimes J)\Lambda_2$ that are of size KM×KM.

The coefficients $\eta_k$ for $k=1, \ldots, K$, give a measure of the mean amplitude of the wanted signals after equalization $$\eta_k = \frac{\lambda_k}{1 + \lambda_k} \frac{E_s}{(E_s - \overline{v}_k^2)} = \frac{2E_s}{M(1 + \lambda_k)} \operatorname{Re}[tr([\Lambda_1]_{k,k}) + tr(J[\Lambda_2]_{k,k})]$$

The above expression shows that $\eta_k$ is independent of the index m inside the data block. In the first iteration, when there is no soft information coming from the decoder, $\overline{v}_k^2 = E_s$ and $\lambda_k = 0$, and $\eta_k$ therefore becomes precisely that of a widely linear MIMO equalizer in a non-iterative receiver.

The block (502) calculates the estimates $\hat{\sigma}_{eq,k}^2$, $k=1, \ldots, K$ of the variance of the noise after equalization for each user $$\hat{\sigma}_{eq,k}^2 = E_s \eta_k (1 - \eta_k)$$

Another embodiment of the invention is described next, applicable to signals modulated with a constellation of the π/2-M-PAM or π/2-BPSK type.

In accordance with this embodiment, the step $13_k$ of modulation of the transmitted signal uses real constellations, for example M-PAM or BPSK, but a phase rotation of π/2 is applied to all the even symbols of each user.

This type of modulation makes it possible to reduce the ratio between the peak power and the mean power of the transmitted signal, thereby reducing the constraints on the power amplifier compared to constellations that undergo no rotation. Indicating the imaginary unit by j, the series of symbols transmitted by a user will then be: $c_k(1)=s_k(1)$, $c_k(2)=js_k(2)$, $c_k(3)=s_k(3)$, $c_k(4)=js_k(4)$, etc.

Note also that the framing function 14 divides the modulated data symbols into blocks of M transmitted symbols. It is assumed hereinafter that M is even. With M odd the covariance matrix will be filled and the complexity of the calculation of the equalizer will be greater, and this situation will therefore not be discussed here. The data blocks may be written as follows:

$$c_k = \text{diag}([1 j 1 j \ldots 1 j]) s_k = \text{diag}(\phi) s_k$$

It is immediately verified that the covariance matrix of such a constellation is $E[cc^H]=E[ss^H]=E_s I_{MK}$.

In this case the framing function uses framing with cyclic prefix and possibly cyclic suffix.

Modifications to the receiver are necessary for this embodiment, and are described in detail hereinafter.

The global structure of the equalizer 100 shown in FIG. 8 remains the same. Some sub-blocks must be modified, however.

Figure 16:
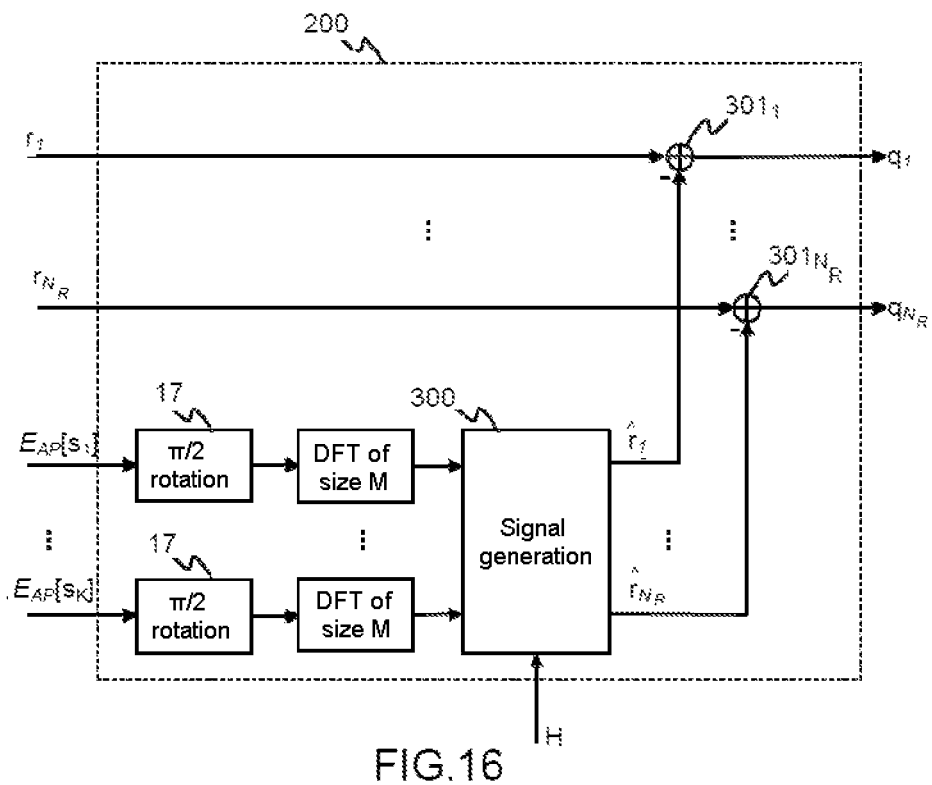
FIG. 16 is another diagram showing in detail the function of generating a corrective signal in the FIG. 8 turbo-equalizer in the case of particular constellations.

The interference cancellation block 200 is shown in detail again in FIG. 16. It converts each vector of size M containing the soft estimates of the transmitted symbols $E_{AP}[s_k]$, k=1, ... K into the frequency domain via a discrete Fourier transform DFT of size M. The soft estimates, which are real values in this embodiment, at the odd indices of the input block are left unchanged; those of even index are multiplied by the imaginary unit j. This operation is carried out by the block 17. The rest of the block 200 then functions as before. It is therefore a question in this case also of generating an estimate of the signals received from the various users from an estimate of the channel H and to subtract this estimate from the received signal to obtain a corrective signal. The $N_R$ vectors of size M at the output of the block 200 modified in this way concatenated together into a single vector can therefore be written in the form: $q = r - H(I_K \otimes (F_M \text{diag}(\phi))) E_{AP}[s]$ of size $N_R M$, with $\phi = [1 \ j \ \ldots \ 1 \ j]$ vector of size M.

Figure 17:
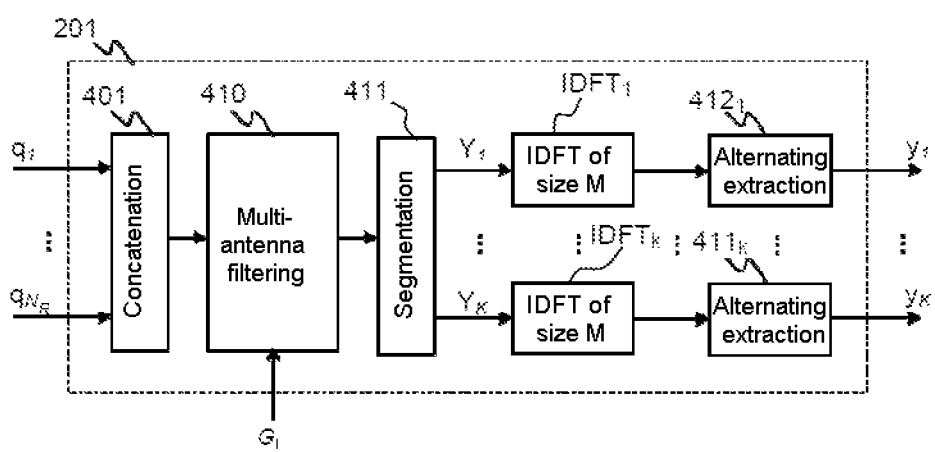
FIG. 17 is a diagram showing in detail the function of widely linear filtering in the FIG. 8 turbo-equalizer in the case of particular constellations.

The block 201 executing widely linear filtering is also slightly modified in the context of rotated real constellations and is shown again in FIG. 17. The input is filtered by a filter $G_1$ as in the cases of real (non-rotated) constellations but with different coefficients. After conversion into the time domain (IDFT), a new block 412 executing alternating extraction must be added. This block conjointly rotates the symbols of the constellation and produces the correct combination enabling exploitation of the fact that the source constellation is real. Consider a vector $a=[a(1) a(M)]$ of even size M as input to the block 412; the vector $b=[b(1) b(M)]$ of size M at the output is then written:

$$b(2m-1)=2Re[a(2m-1)], m=1, \ldots, M/2$$

$$b(2m)=2Im[a(2m)], m=1, \ldots, M/2$$

where Re( ) and Im( ) are respectively the extraction of the real and imaginary part of the argument. In fact, the block 412 alternately extracts the real and imaginary part of the input vector and multiplies them by 2.

In fact, for rotated real constellations it is possible to show that the filter $G_I$ (which filters the signal) and the filter $G_Q$ (which filters the conjugate signal) are linked by the following equation:

$$G_Q = G^*_I (I_M \otimes J_{M/2})$$

in which the matrix $J_{M/2}$ is defined as follows $$J_{M/2} = F_M \text{diag}([1 - 1 \ldots 1 - 1]) F_M^T = F_M \text{diag}(\phi_1) F_M^T \quad (29)$$

Like the matrix J in the case of real constellations, $J_{M/2}$ is a permutation of the identity matrix, an anti-diagonal of values at 1 starts at the entry (M/2+1, 1) of the matrix. The values 1 are therefore localized in the entries ([(M/2−m) mod M]+1, m), for m=1, ..., M. $J_{M/2}$ has the same properties as the matrix J. Multiplication by this matrix may be implemented by permutations.

Denoting by q the vector obtained by concatenation of all the vectors $q_n$, n=1, ..., $N_R$, and y the vector obtained by concatenation of the vectors $y_k$, k=1, ... K, using the preceding property the equalized symbols vector can be written thus $$Y = G_I^H q + (I_M \otimes J_{M/2})(G_I^H)^* q^* = G_I^H q + (I_M \otimes J_{M/2})(G_I^H q)^*$$

By denoting by $q_{I,t} = (I_K \otimes R_M^H)(G_I^H q)$ the signal in the time domain after filtering by the filter $G_I$ it is possible to demonstrate that the signal converted into the time domain and passed through the block 412 can be written $$y = (I_K \otimes (\text{diag}(\phi^*) F_M^H)) Y = (I_K \otimes \text{diag}(\phi^*)) \lfloor q_{I,t} + (I_M \otimes \text{diag}(\phi_1)) q^*_{I,t} \rfloor$$

The above is the mathematical description of the operations carried out by the block 412.

The block 202 to be used is that in the case of real constellations and is shown in FIG. 13. It remains unchanged. Only the numerical values of the factors $\eta_k$ for k=1, ..., K change.

Where the block 101 is concerned that calculates the equalizer and parameters for soft demapping, the structure remains the same as in FIG. 15.

The block 502 that calculates the variances of the noise after equalization remains unchanged compared to the case of real constellations.

The block 501 requires the following modifications.

The expression (21) and (22) remain the same but the matrix $\hat{\Sigma}$, the vectors $\otimes_{k,m}$ and the coefficients $\lambda_k$ change. Indeed, in the case of rotated real constellations the quantities of the preceding equations are $$\mathcal{B} = H(I_K \otimes F_M)(I_K \otimes \text{diag}(\phi)); \otimes_{k,m} = H(I_K \otimes F_M)(I_K \otimes \text{diag}(\phi)) e_{m+(k-1)M} \quad (30)$$

The matrix $\hat{\Sigma}$ is again written in its generic form (14). Its sub-matrices take the following forms enabling efficacious calculation of the covariance matrix and its inverse.

It is a simple matter to show that for rotated real constellations the covariance matrix of the rotated symbols is the same as that of the non-rotated real symbols. This implies that the covariance matrix of the received signal in the first iteration and in successive iterations are respectively written $\Sigma_{1,1} + E_s H H^H + \hat{\sigma} I_{N_R M}$ and $\Sigma_{1,1} = H(\text{diag}(\bar{v}_1^2, \ldots, \bar{v}_k^2, \ldots, v_K^2) \otimes I_M) H^H + \hat{\sigma} I_{N_R M}$ exactly as in the case of real constellations.

The difference appears for the pseudo-covariance matrix $\Sigma_{1,2}$ of the received signal. It is a simple matter to demonstrate that in the first iteration (the a priori information is not defined) the pseudo-covariance matrix takes the following form $$\Sigma_{1,2} = E_s H (I_K \otimes J_{M/2}) H^T$$

where $\tilde{\Sigma}_s = E[(s_k(m))^2)] = E_s$ as in the case of real constellations. The matrix $J_{M/2}$ is defined in equation (29) and its application can be implemented by a simple permutation. The matrix $J_{M/2}$ represents a translation of M/2 samples on the frequency axis of a discrete periodic signal. The matrix $J_{M/2}$ is the operation corresponding to the multiplication of the signal $\phi_1 = [1-1 \ldots 1-1]$ in the time domain that may be seen as a modulation by a periodic signal $[1-1]$.

In successive iterations, when the soft information coming from the decoders is non-null, the pseudo-covariance takes the form $$\Sigma_{1,2} = H(diag(\bar{v}_1^2, \ldots, \bar{v}_k^2, \ldots \bar{v}_K^2) \otimes J_{M/2})H_T$$

Note therefore that the pseudo-covariance matrix for rotated real constellations has the same structure as the pseudo-covariance matrix for real constellations with the sole difference that $J_{M/2}$ takes the place of J. This gives a different permutation in the calculations.

Note that $\Sigma_{1,1}$ is a block diagonal matrix and that $\Sigma_{1,2}$ is a block matrix in which each block has the structure of the matrix $J_{M/2}$. Hereinafter the matrix is said to have a $J_{M/2}$ block structure.

The matrices $S_1$ and $S_2$ are then calculated using equation (25), which can be done in a less complex way thanks to the structure of the matrices involved. The matrices $S_1$ and $S_2$ have the same properties as in the case of real constellations. The matrices $\Lambda_1$ and $\Lambda_2$ are also calculated as in equation (27). The coefficients $\lambda_k$, $k=1, \ldots, K$ that measure the influence on the equalizer of the soft information coming from the decoders are written in a slightly modified form compared to equation (28):

$$\lambda_k = \frac{2(E_s - \bar{v}_k^2)}{M} \text{Re}[tr([\Lambda_1]_{k,k}) + tr(J_{M/2}[\Lambda_2]_{k,k})]. \quad (31)$$

As in the case of real constellations, it can be shown that these coefficients are independent of m and can be calculated once only for all the symbols in an efficacious manner, simply by using the diagonal coefficients of the block diagonal matrices $\Lambda_1$ and $(I_K \otimes J_{M/2})\Lambda_2$ which are of size KM×KM.

The coefficients $\eta_k$ for $k=1, \ldots, K$ give a measure of the mean amplitude of the wanted signals after equalization and are calculated as in the case of real constellations as a function of $\lambda_k$.

$$\eta_k = \frac{\lambda_k}{1+\lambda_k} \frac{E_s}{(E_s - \bar{v}_k^2)} = \frac{2E_s}{M(1+\lambda_k)} \text{Re}[tr([\Lambda_1]_{k,k}) + tr(J_{M/2}[\Lambda_2]_{k,k})]$$

The above expression shows that $\eta_k$ is independent of the index m inside the data block. In the first iteration, when there is no soft information from the decoder, $\bar{v}_k^2 = E_s$ and $\lambda_k = 0$, and $\eta_k$ therefore becomes exactly that of a widely linear MIMO equalizer in a non-iterative receiver.

By concatenating all the filters (22) and using equation (30), factorizing the DFT operation $F_M$ and the rotation $(diag(\phi))$, it is possible to write the matrix of the global filter of size $2N_R M \times KM$, $$G_{WL} = G_{WL}(I_K \otimes F_M diag(\phi))$$

$G_{WL}$ is the $2N_R M \times KM$ matrix of the frequency-domain filter $$G_{WL} = \begin{bmatrix} G_I \\ G_Q \end{bmatrix} = E_s \hat{\Sigma}^{-1} \begin{bmatrix} H \\ H^*(I_K \otimes J_{M/2}) \end{bmatrix} (D \otimes I_M)$$

The matrix $G_{WL}^H = (I_K \otimes diag(\phi^*)F_M^H)G_{WL}^H$ is applied to the signal thereby causing to appear the inverse Fourier transform IDFT $F_M^H$ and the de-rotation $diag(\phi^*)$.

$G_{WL}$ has the same structure as the filter in the case of real constellations with the matrix $J_{M/2}$ in place of J, the coefficients $\lambda_k$ are calculated using equation (31) and D is calculated using equation (23).

Following the developments of the case of real constellations, $G_{WL}$ can also be expressed in the following form $$G_{WL} = \begin{bmatrix} G_I \\ G_Q \end{bmatrix} = E_s \begin{bmatrix} S_1 H(D \otimes I_M) + S_2 H^*(D \otimes J_{M/2}) \\ S_2^* H(D \otimes I_M) + S_1^* H^*(D \otimes J_{M/2}) \end{bmatrix} \quad (32)$$

Note that here also the matrices of the equalizer can be calculated rapidly because they are products of block diagonal matrices or matrices with the $J_{M/2}$ block structure. Indeed, as explained above, in the case of rotated real constellations, $G_Q = G^*_I(I_M \otimes J_{M/2})$. Therefore only the matrix $G_I$ is necessary.

Figure 18:
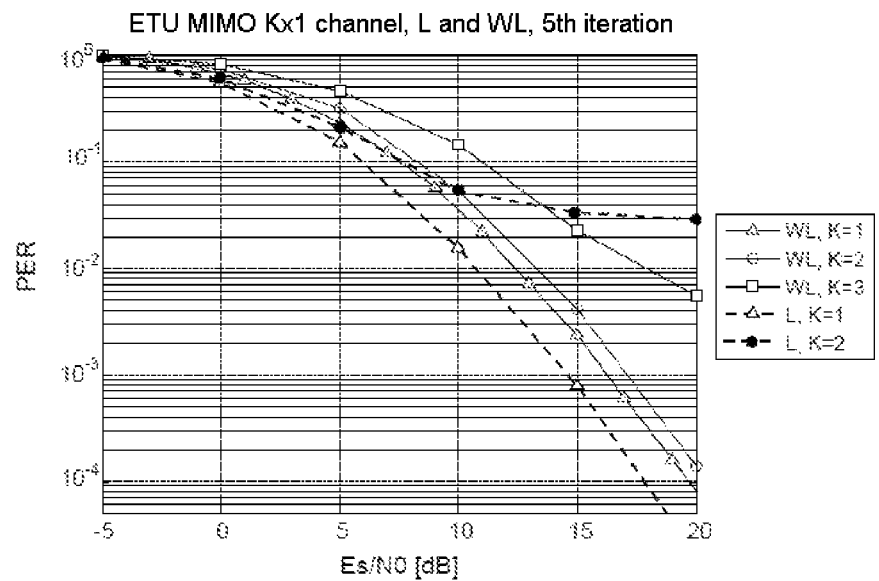
FIG. 18 is a diagram showing the packet error rate as a function of the signal-to-noise ratio expressed in decibels in an SC-FDMA type system with one receiving antenna with an ETU type propagation channel for a prior art linear turbo-equalizer combined with QPSK modulation and a ⅓ convolutional code and a widely linear turbo-equalizer in accordance with the invention combined with 4-PAM modulation and a ⅓ convolutional code.
Figure 19:
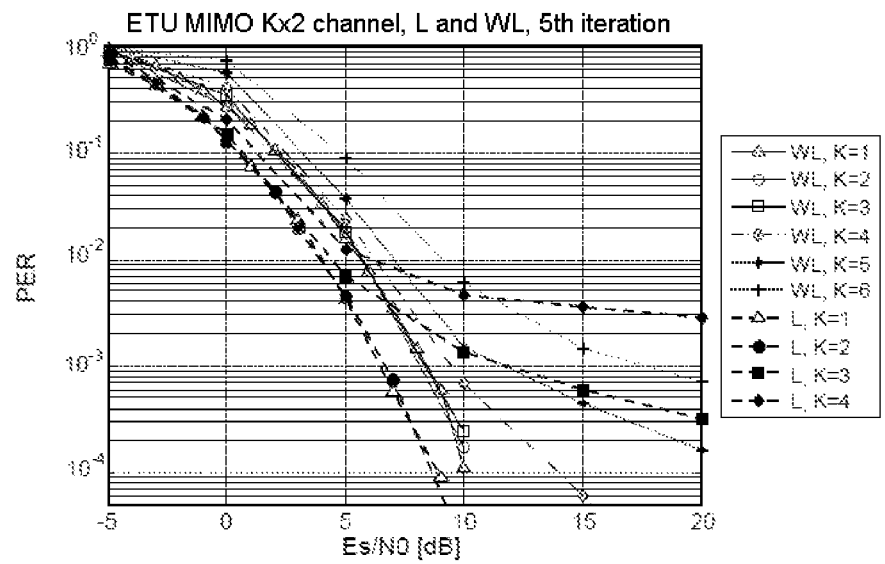
FIG. 19 is a diagram showing the packet error rate as a function of the signal-to-noise ratio expressed in decibels in an SC-FDMA type system with two receiving antennas with an ETU type propagation channel for a prior art linear turbo-equalizer combined with QPSK modulation and a ⅓ convolutional code and a widely linear turbo-equalizer in accordance with the invention combined with 4-PAM modulation and a ⅓ convolutional code.

FIGS. 18 and 19 show the performance in terms of packet error rate obtained using the equalization method in accordance with the invention.

FIGS. 18 and 19 show the packet error rate in an SC-FDMA system using an ETU channel for a prior art linear turbo-equalizer with QPSK and ⅓ convolutional code and for a widely linear turbo-equalizer in accordance with the invention with 4-PAM and ⅓ convolutional code. FIG. 18 shows the performance obtained with one receiving antenna and FIG. 19 shows the performance obtained with two receiving antennas. The receiver uses five iterations and the received signals all have the same mean power. The curves labelled L are those obtained with a prior art linear turbo-equalizer. The curves labelled WL are those obtained with a widely linear turbo-equalizer according to the invention. K is the number of users, in other words the number of signals transmitted simultaneously.

Linear turbo-equalization with K=1 (single-user) and with a low signal-to-noise ratio shows an improvement over widely linear turbo-equalization because of the better form factor of QPSK compared to 4-PAM. This form factor improvement disappears on considering 4-PAM with a linear turbo-equalizer. Note that, even with the form factor improvement, in the situation with one receiving antenna, the linear turbo-equalizer is not able to support two users with an acceptable packet error rate (PER). On the other hand, the widely liner turbo-equalizer in accordance with the invention is able to decode two users with a 3 dB deterioration relative to the linear case. This improvement is down to the implementation of the equalizer $G_I$. This is down to the equations (25) in which $S_2$ is non-null. In the linear receiver situation $S_2$ is null because the pseudo-covariance matrix $\Sigma_{1,2}$ is made to be null.

In the case of a receiver having two antennas the conclusion are similar. For one user or two users decoded simultaneously, the proposed method of widely linear turbo-equalization has a signal-to-noise ratio reduced approximately 2 dB relative to the linear turbo-equalization method. It nevertheless is able to support more users than a standard linear receiver, notably 4 users, without significant deterioration of performance in terms of packet error rate.

The equalization method in accordance with the invention may be implemented in software and/or hardware. It may notably be implemented as a computer program including instructions for its execution. The computer program may be stored on a processor-readable storage medium.

The turbo-equalizer in accordance with the invention may notably be implemented in the form of a processor which may be a generic processor, a dedicated processor, an application-specific integrated circuit (ASIC) or a field-programmable gate array (FPGA).

REFERENCES

[1] P. Chevalier, F. Pipon, "New Insights into Optimal Widely Linear Array Receivers for the Demodulation of BPSK, MSK, and GMSK Signals corrupted by Noncircular Interferences—Application to SAIC", IEEE Trans. on Signal Processing, v. 54, n. 3, pp: 870-883, March 2006.
[2] M. Tüchler, A. C. Singer, "Turbo Equalization: An Overview," IEEE Trans. Information Theory, vol. 57, no. 2, pp. 920-952, February 2011.
[3] T. Li, W. Wang, and X. Gao, "Turbo equalization for LTE uplink under imperfect channel estimation," in Proc. IEEE 20th Int. Symp. Pers., Indoor Mobile Radio Commun., pp. 330-334, September 2009.
[4] Zhongxia Pan, Gang Wu, Shu Fang, and Dengsheng Lin, "Practical soft-SIC detection for MIMO SC-FDMA system with co-channel interference", 2010 Int. Conference on Wireless Communications and Signal Processing (WCSP 2012), pp. 1-5, 21-23 Oct. 2010.
[5] S.-R. Lee, F.-B. Ueng, H.-F. Wang, and Y.-K. Chang, "Iterative multiuser detection for LDPC MIMO SC-FDMA communication systems", Wiley Trans Emerging Tel Tech. doi: 10.1002/ett.2773, 15 Jan. 2014.
[6] G. Dietl, C. Mensing, W. Utschick, "Iterative Detection Based on Widely Linear Processing and Real-Valued Symbol Alphabets", 11th European Wireless Conference 2005—Next Generation Wireless and Mobile Communications and Services (European Wireless), Nicosia, Cyprus, April 2005.

The invention claimed is:

1. A received signal equalization method using at least one equalizer filter to equalize a signal received by a plurality of antenna elements, said received signal being produced by a transmission of signals by a plurality of transmitters, said method comprising:
converting the received signal into a frequency domain to obtain a frequency domain signal,
subtracting from said frequency domain signal an estimate of an intersymbol interference and an interference between users to obtain a complex corrective signal,
conjoint widely linear filtering said complex corrective signal and a conjugate of the complex corrective signal to obtain an equalized signal,
converting the equalized signal into a time domain,
calculating a covariance matrix of the received signal,
calculating a pseudo-covariance matrix of the received signal at least from a pseudo-covariance of symbols of said transmitted signals, and
calculating coefficients of said at least one equalizer filter from the covariance matrix and the pseudo-covariance matrix of the received signal.

2. The received signal equalization method of claim 1 further comprising:
subtracting from said received signal an estimate of a transmitted signal, and
combining the equalized signal with the estimate of the transmitted signal,
the step of widely linear filtering being configured to produce from a number NR, equal to a number of antenna elements, of complex corrective signals, a number K, equal to a number of transmitted signals, of equalized complex corrective signals.

3. The received signal equalization method of claim 2 wherein the step of widely linear filtering comprises filtering said complex corrective signal using a first equalizer filter and a conjugate complex corrective signal using a second equalizer filter.

4. The received signal equalization method of claim 2 wherein the step of widely linear filtering comprises filtering said complex corrective signal using an equalizer filter and said equalization method further comprises a step of extracting a real part of each value of the equalized signal converted into the time domain.

5. The received signal equalization method of claim 2 wherein the step of widely linear filtering comprises filtering said complex corrective signal using an equalizer filter and said equalization method further comprises a step of extracting alternately a real part or an imaginary part of each successive value of the equalized signal converted into the time domain.

6. The received signal equalization method of claim 1 wherein the step of calculating the coefficients of the equalizer filter comprises:
calculating the equalizer filter in the frequency domain and of calculating an estimate of an amplitude of the symbols of a transmitted signal, and
calculating the covariances and pseudo-covariances of the signal after equalization.

7. Use of the method of claim 1 of equalizing a received signal applied to a signal modulated in accordance with a real constellation, for example a constellation of a BPSK or M-PAM type.

8. Use of the method of claim 1 applied to a signal modulated in accordance with an alternately real or imaginary constellation, for example a constellation of a $\pi/2$ BPSK or $\pi/2$ M-PAM type.

9. A method of turbo-equalization of a received signal comprising an iterative execution of the following steps:
executing a received signal equalization method using at least one equalizer filter to equalize a signal received by a plurality of antenna elements, said received signal being produced by a transmission of signals by a plurality of transmitters, said method comprising:
converting the received signal into a frequency domain to obtain a frequency domain signal,
subtracting from said frequency domain signal an estimate of an intersymbol interference and an interference between users to obtain a complex corrective signal,
conjoint widely linear filtering said complex corrective signal and a conjugate of the complex corrective signal to obtain an equalized signal,
converting the equalized signal into a time domain,
calculating a covariance matrix of the received signal,
calculating a pseudo-covariance matrix of the received signal at least from a pseudo-covariance of symbols of said transmitted signals, and
calculating coefficients of said at least one equalizer filter from the covariance matrix and the pseudo-covariance matrix of the received signal;
the method of turbo-equalization also comprising:
converting the equalized signals into demodulated bits,
decoding the demodulated bits, and converting the decoded bits into an estimate of a transmitted signal.

10. A computer program comprising instructions stored on a tangible non-transitory storage medium for executing on a processor a received signal equalization method using at least one equalizer filter to equalize a signal received by a plurality of antenna elements, said received signal being produced by a transmission of signals by a plurality of transmitters, said method comprising:
- converting the received signal into a frequency domain to obtain a frequency domain signal,
- subtracting from said frequency domain signal an estimate of an intersymbol interference and an interference between users to obtain a complex corrective signal,
- conjoint widely linear filtering said complex corrective signal and a conjugate of the
- complex corrective signal to obtain an equalized signal,
- converting the equalized signal into a time domain,
- calculating a covariance matrix of the received signal,
- calculating a pseudo-covariance matrix of the received signal at least from a pseudo-covariance of symbols of said transmitted signals,
- calculating coefficients of said at least one equalizer filter from the covariance matrix and the pseudo-covariance matrix of the received signal.

11. A receiver including a plurality of antenna elements for receiving a signal transmitted by a plurality of transmitters and a processor configured to execute a received signal equalization method using at least one equalizer filter to equalize a signal received by a plurality of antenna elements, said received signal being produced by a transmission of signals by a plurality of transmitters, said method comprising:
- converting the received signal into a frequency domain to obtain a frequency domain signal,
- subtracting from said frequency domain signal an estimate of an intersymbol interference and an interference between users to obtain a complex corrective signal,
- conjoint widely linear filtering said complex corrective signal and a conjugate of the complex corrective signal to obtain an equalized signal,
- converting the equalized signal into a time domain,
- calculating a covariance matrix of the received signal,
- calculating a pseudo-covariance matrix of the received signal at least from a pseudo-covariance of symbols of said transmitted signals,
- calculating coefficients of said at least one equalizer filter from the covariance matrix and the pseudo-covariance matrix of the received signal.

* * * * *